United States Patent
Yadin et al.

(10) Patent No.: US 11,768,407 B2
(45) Date of Patent: Sep. 26, 2023

(54) ELECTRICALLY-TUNABLE LENSES AND LENS SYSTEMS

(71) Applicant: Optica Amuka (A.A.) Ltd., Petach Tikva (IL)

(72) Inventors: Yoav Yadin, Ganey Tikva (IL); Yariv Haddad, Raanana (IL); Alex Alon, Binyamina (IL)

(73) Assignee: OPTICA AMUKA (A.A.) LTD., Petach Tikva (IL)

( * ) Notice: Subject to any disclaimer, the term of this patent is extended or adjusted under 35 U.S.C. 154(b) by 37 days.

(21) Appl. No.: 17/340,138

(22) Filed: Jun. 7, 2021

(65) Prior Publication Data
US 2021/0294162 A1    Sep. 23, 2021

Related U.S. Application Data

(63) Continuation of application No. 15/120,529, filed as application No. PCT/IB2015/051766 on Mar. 11, (Continued)

(51) Int. Cl.
*G02F 1/1343* (2006.01)
*G02F 1/29* (2006.01)

(52) U.S. Cl.
CPC .... *G02F 1/134309* (2013.01); *G02F 1/13439* (2013.01); *G02F 1/29* (2013.01); *G02F 1/294* (2021.01)

(58) Field of Classification Search
CPC .............................. G02F 1/13306; G02F 1/294
See application file for complete search history.

(56) References Cited

U.S. PATENT DOCUMENTS 6,491,394 B1  12/2002  Blum et al.
8,690,321 B2  4/2014  Lapstun
(Continued)

FOREIGN PATENT DOCUMENTS

CN  108845433 A  11/2018
RU  2541819 C2  2/2015
(Continued)

OTHER PUBLICATIONS

EP Application # 18869416 Search Report dated Jun. 16, 2021.
(Continued)

*Primary Examiner* — Jonathan Y Jung
(74) *Attorney, Agent, or Firm* — KLIGLER & ASSOCIATES PATENT ATTORNEYS LTD

(57) ABSTRACT

An optical device includes an electro-optical layer, having an effective local index of refraction that is determined by a voltage waveform applied across the electro-optical layer at the location. A first array of first excitation electrodes extend along respective, mutually-parallel first axes in a first direction over the active area on a first side of the electro-optical layer. A second array of second excitation electrodes extend along respective, mutually-parallel second axes in a second direction, orthogonal to the first direction, over the active area on a second side of the electro-optical layer, opposite the first side. Control circuitry is coupled to apply respective control voltage waveforms to the excitation electrodes and is configured to concurrently modify the respective control voltage waveforms applied to both the first excitation electrodes and the second excitation electrodes so as to generate a specified phase modulation profile in the electro-optical layer.

20 Claims, 15 Drawing Sheets

Related U.S. Application Data 2015, now Pat. No. 11,126,040, which is a continuation-in-part of application No. PCT/IB2013/058989, filed on Sep. 30, 2013.

(60) Provisional application No. 61/972,445, filed on Mar. 31, 2014, provisional application No. 61/969,190, filed on Mar. 23, 2014, provisional application No. 61/952,226, filed on Mar. 13, 2014, provisional application No. 61/707,962, filed on Sep. 30, 2012.

(56) References Cited

U.S. PATENT DOCUMENTS

| | | |
|---|---|---|
| 2003/0058406 A1 | 3/2003 | Blum et al. |
| 2008/0239420 A1 | 10/2008 | McGrew |
| 2009/0096981 A1 | 4/2009 | Clarke et al. |
| 2009/0103044 A1 | 4/2009 | Duston et al. |
| 2010/0149444 A1* | 6/2010 | Hikmet ............ G02F 1/134372 349/122 |
| 2010/0157181 A1* | 6/2010 | Takahashi ............ H04N 13/305 349/200 |
| 2012/0098875 A1* | 4/2012 | Shinkai ................ G02B 6/0013 362/613 |
| 2012/0257131 A1* | 10/2012 | Galstian .............. G02F 1/13439 349/36 |
| 2013/0010256 A1 | 1/2013 | Haddock et al. |
| 2013/0128229 A1 | 5/2013 | Huang |
| 2013/0215374 A1 | 8/2013 | Blum et al. |
| 2013/0250223 A1* | 9/2013 | Takagi .............. G02F 1/134309 349/138 |
| 2015/0378240 A1 | 12/2015 | Wang et al. |
| 2016/0161767 A1 | 6/2016 | Childers |
| 2016/0209647 A1 | 7/2016 | Fursich |
| 2016/0370605 A1 | 12/2016 | Ain-Kedem |
| 2017/0003519 A1 | 1/2017 | Burkert et al. |
| 2018/0136486 A1 | 5/2018 | Macnamara et al. |
| 2018/0356652 A1 | 12/2018 | Shibuya et al. |

FOREIGN PATENT DOCUMENTS

| | | |
|---|---|---|
| WO | 2017003330 A1 | 1/2017 |
| WO | 2017049072 A1 | 3/2017 |

OTHER PUBLICATIONS

U.S. Appl. No. 16/085,581 Office Action dated Sep. 20, 2021.
EP Application #21202537.1 Search Report dated Nov. 4, 2021.
IN Application # 202248050033 Office Action dated Nov. 30, 2022.
EP Appication #20199016.5 Office Action dated Dec. 1, 2022.
EP Application # 19841482.3 Search Report dated May 13, 2022.
U.S. Appl. No. 16/648,695 Office Action dated Jun. 9, 2022.
International Application # PCT/IB2022/052812 Search Report dated Jun. 30, 2022.
U.S. Appl. No. 17/521,887 Office Action dated Mar. 23, 2023.
EP Application #20819033.0 Search Report May 17, 2023.
EP Application # 18869416.0 Office Action dated May 26, 2023.

* cited by examiner

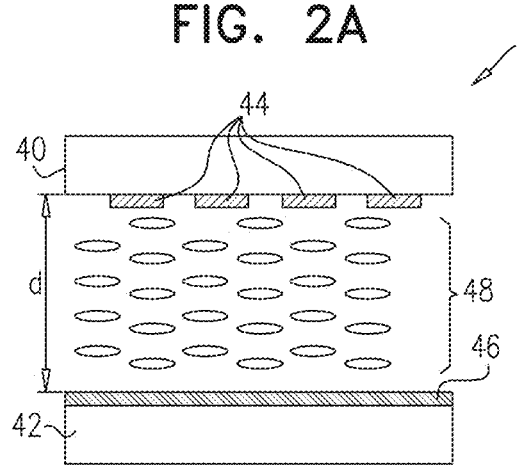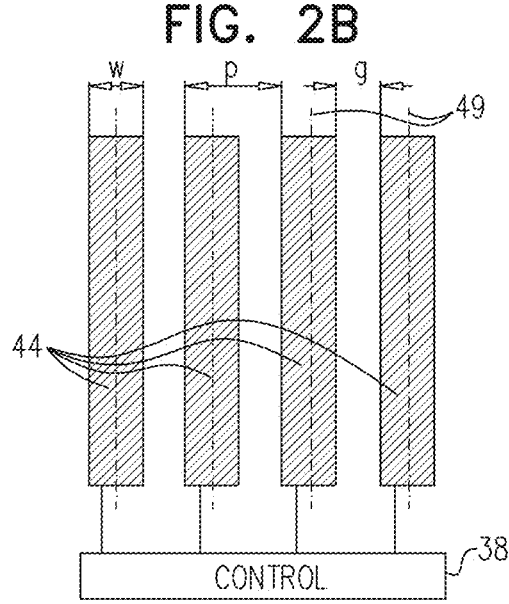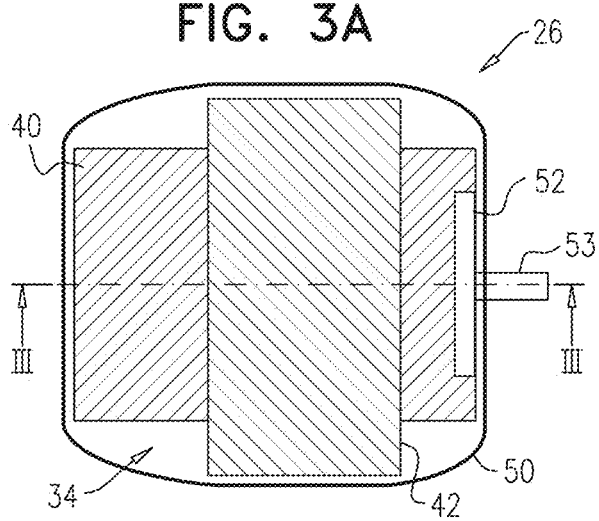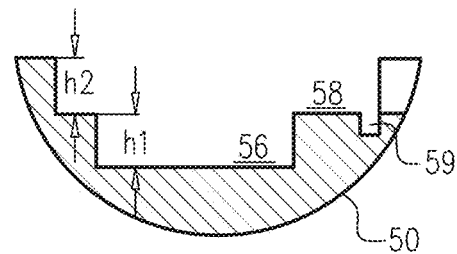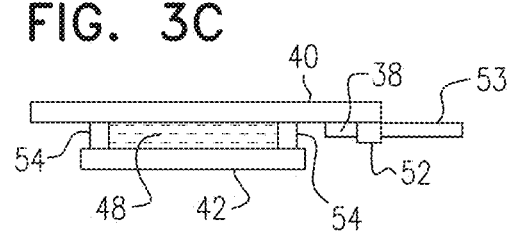

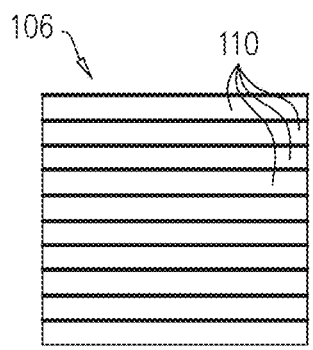 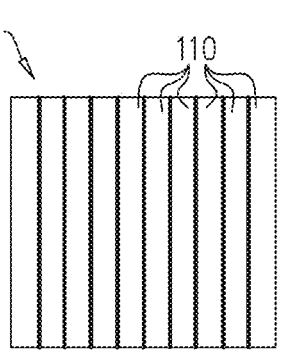 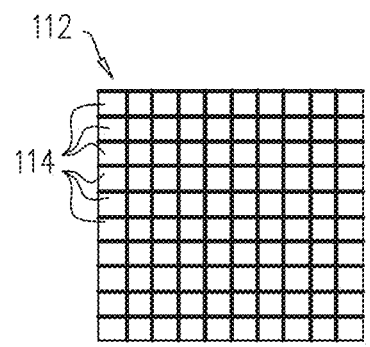
FIG. 14A  FIG. 14B  FIG. 14C
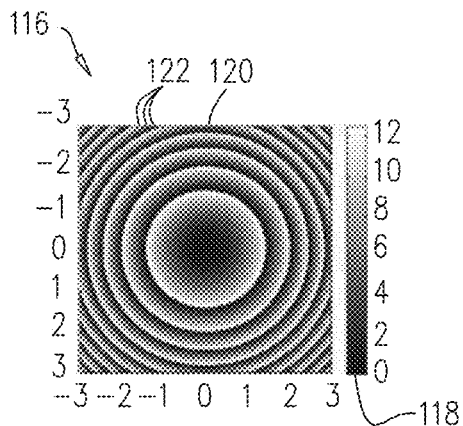
FIG. 15
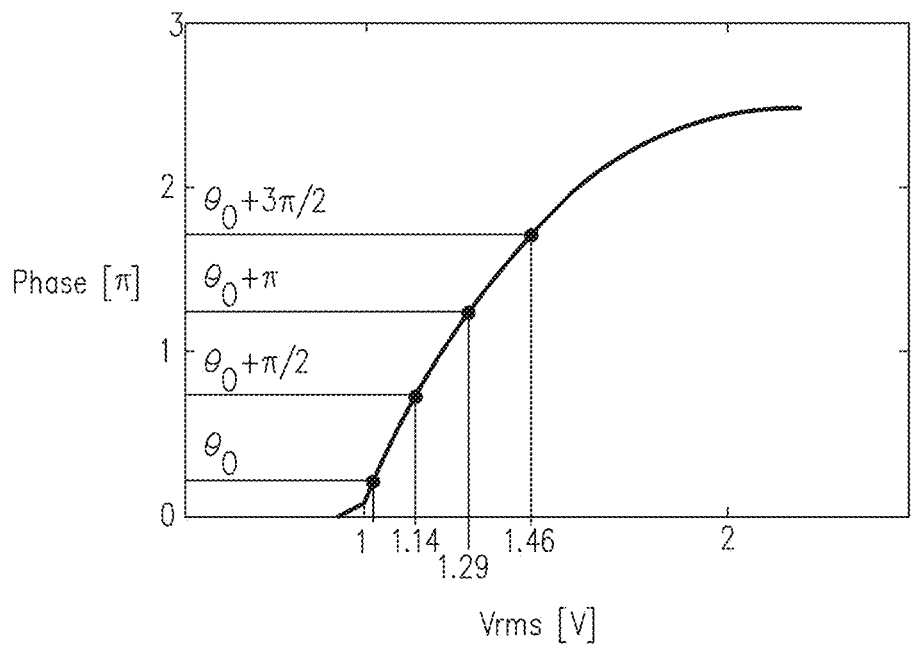
FIG. 16

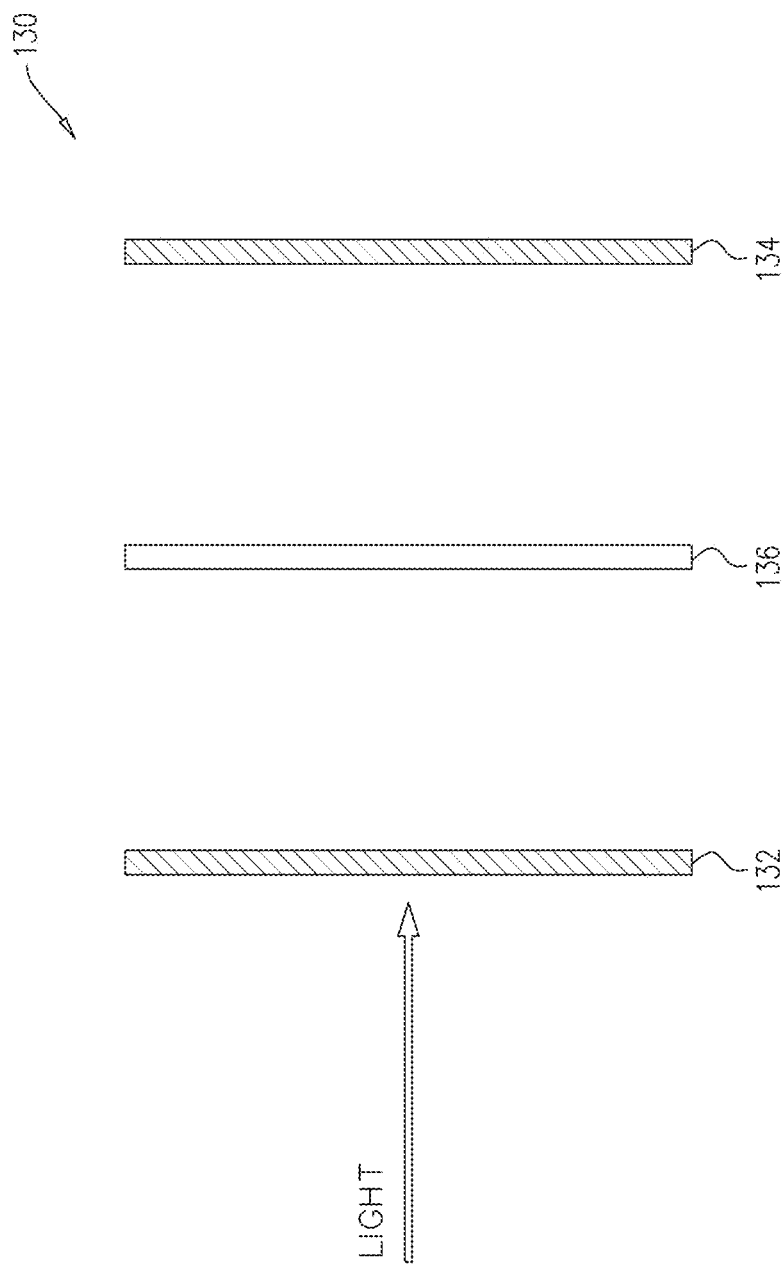

ELECTRICALLY-TUNABLE LENSES AND LENS SYSTEMS

CROSS-REFERENCE TO RELATED APPLICATIONS

This application is a continuation of U.S. patent application Ser. No. 15/120,529, filed Aug. 22, 2016, in the national phase of PCT Patent Application PCT/IB2015/051766, filed Mar. 11, 2015, which claims the benefit of U.S. Provisional Patent Application 61/952,226, filed Mar. 13, 2014; U.S. Provisional Patent Application 61/969,190, filed Mar. 23, 2014; and U.S. Provisional Patent Application 61/972,445, filed Mar. 31, 2014. This application is also a continuation-in-part of PCT Patent Application PCT/IB2013/058989, filed Sep. 30, 2013 (published as WO 2014/049577), which claims the benefit of U.S. Provisional Patent Application 61/707,962, filed Sep. 30, 2012. All of these related applications are incorporated herein by reference.

FIELD OF THE INVENTION

The present invention relates generally to optical devices, and particularly to electrically-tunable lenses.

BACKGROUND

Tunable lenses are optical elements whose optical characteristics, such as the focal length and/or the location of the optical axis, can be adjusted during use, typically under electronic control. Such lenses may be used in a wide variety of applications. For example, U.S. Pat. No. 7,475,985, whose disclosure is incorporated herein by reference, describes the use of an electro-active lens for the purpose of vision correction.

Electrically-tunable lenses typically contain a thin layer of a suitable electro-optical material, i.e., a material whose local effective index of refraction changes as a function of the voltage applied across the material. An electrode or array of electrodes is used to apply the desired voltages in order to locally adjust the refractive index to the desired value. Liquid crystals are the electro-optical material that is most commonly used for this purpose (wherein the applied voltage rotates the molecules, which changes the axis of birefringence and thus changes the effective refractive index), but other materials, such as polymer gels, with similar electro-optical properties can alternatively be used for this purpose.

Some tunable lens designs use an electrode array to define a grid of pixels in the liquid crystal, similar to the sort of pixel grid used in liquid-crystal displays. The refractive indices of the individual pixels may be electrically controlled to give a desired phase modulation profile. (The term "phase modulation profile" is used in the present description and in the claims to mean the distribution of the local phase shifts that are applied to light passing through the layer as the result of the locally-variable effective refractive index over the area of the electro-optical layer of the tunable lens.) Lenses using grid arrays of this sort are described, for example, in the above-mentioned U.S. Pat. No. 7,475,985.

The above-mentioned PCT International Publication WO 2014/049577 describes optical devices that include an electro-optical layer, such as a liquid crystal, having an effective local index of refraction at any given location within the active area of the electro-optical layer that is determined by a voltage waveform applied across the electro-optical layer at the given location. An array of excitation electrodes, including parallel conductive stripes extending over the active area, is disposed over one or both sides of the electro-optical layer. Control circuitry applies respective control voltage waveforms to the excitation electrodes and is configured to concurrently modify the respective control voltage waveforms applied to excitation electrodes so as to generate a specified phase modulation profile in the electro-optical layer.

SUMMARY

Embodiments of the present invention that are described hereinbelow provide improved electrically-tunable optical devices.

There is therefore provided, in accordance with an embodiment of the invention, an optical device, which includes an electro-optical layer, having an effective local index of refraction at any given location within an active area of the electro-optical layer that is determined by a voltage waveform applied across the electro-optical layer at the location. Conductive electrodes extend over opposing first and second sides of the electro-optical layer. The electrodes include an array of excitation electrodes, which extend along respective, mutually-parallel axes in a predefined direction across the first side of the electro-optical layer, and which includes at least first and second electrodes having different, respective widths in a transverse direction, perpendicular to the axes. Control circuitry is coupled to apply respective control voltage waveforms to the excitation electrodes so as to generate a specified phase modulation profile in the electro-optical layer.

In some embodiments, the respective widths of the electrodes differ from one another with a standard variation that is at least 10% of a mean width of all the electrodes. Additionally or alternatively, the respective widths of at least some of the electrodes vary along the respective axes of the electrodes.

In some embodiments, the array of excitation electrodes includes a first array of first excitation electrodes, extending in a first direction across the first side of the electro-optical layer. The conductive electrodes includes a second array of second excitation electrodes, which extend in a second direction, perpendicular to the first direction, across the second side of the electro-optical layer, and which includes at least third and fourth electrodes having different, respective widths.

In other embodiments, the conductive electrodes include a common electrode, positioned over the active area on the second side of the electro-optical layer. Some embodiments provides apparatus including first and second optical devices of this sort, wherein the first and second optical devices are arranged in series, and wherein the excitation electrodes in the second optical device are oriented in a direction orthogonal to the excitation electrodes in the first optical device. In one embodiment, the first and second optical devices include respective, first and second electro-optical layers that are polarization-dependent and are arranged such that the first optical device modulates light in a first polarization, while the second optical device modulates the light in a second polarization, different from the first polarization, and the apparatus includes a polarization rotator positioned between the first and second optical devices so as to rotate the light from the first polarization to the second polarization.

In some embodiments, the first and second electrodes have respective first and second widths, such that the first width is at least twice the second width, and the control circuitry is configured to apply the respective control voltage waveforms so that the specified phase modulation profile has an abrupt transition that occurs in a vicinity of at least one of the second electrodes. In one such embodiment, generation of the specified phase modulation profile causes the device to function as a Fresnel lens. In a disclosed embodiment, the electrodes include parallel stripes of a transparent conductive material having gaps between the stripes of a predefined gap width, and the second width of the second electrodes is no greater than four times the gap width. Additionally or alternatively, the second width of the second electrodes is less than a layer thickness of the electro-optical layer.

In one embodiment, the phase modulation profile has multiple abrupt transitions that occur in respective vicinities of corresponding ones of the second electrodes, and the electro-optical layer is configured to provide a range of phase modulation values that is proportional to a relation between a density of the second electrodes relative to a spacing between the abrupt transitions in the phase modulation function.

In some embodiments, the electro-optical layer includes a liquid crystal.

There is also provided, in accordance with an embodiment of the invention, an optical device, which includes an electro-optical layer as described above, having opposing first and second sides and a layer thickness equal to a distance between the first and second sides. Conductive electrodes extend over the first and second sides of the electro-optical layer. The electrodes include an array of excitation electrodes including parallel stripes of a transparent conductive material having gaps between the stripes of a gap width that is less than the layer thickness of the electro-optical layer. Control circuitry is coupled to apply respective control voltage waveforms to the excitation electrodes so as to generate a specified phase modulation profile in the electro-optical layer.

In a disclosed embodiment, the gap width is less than half the layer thickness.

There is additionally provided, in accordance with an embodiment of the invention, an optical device, which includes an electro-optical layer as described above, and a buffer layer including a transparent dielectric material having an interior surface adjacent to the first side of the electro-optical layer and an exterior surface opposite the interior surface and a thickness of at least 0.2 µm between the interior and exterior surfaces. Conductive electrodes are disposed over the first and second sides of the electro-optical layer and include an array of excitation electrodes extending across the exterior surface of the buffer layer, which separates the excitation electrodes from the electro-optical layer. Control circuitry is coupled to apply respective control voltage waveforms to the excitation electrodes so as to generate a specified phase modulation profile in the electro-optical layer.

In a disclosed embodiment, the excitation electrodes include parallel stripes of a transparent conductive material having gaps between the stripes of a predefined gap width, and the buffer layer has a buffer layer thickness that is more than one-fourth of the gap width.

There is further provided, in accordance with an embodiment of the invention, an optical device, which includes an electro-optical layer as described above. A first array of first excitation electrodes extend along respective, mutually-parallel first axes in a first direction over the active area on a first side of the electro-optical layer. A second array of second excitation electrodes extend along respective, mutually-parallel second axes in a second direction, orthogonal to the first direction, over the active area on a second side of the electro-optical layer, opposite the first side. Control circuitry is coupled to apply respective control voltage waveforms to the excitation electrodes and is configured to concurrently modify the respective control voltage waveforms applied to both the first excitation electrodes and the second excitation electrodes so as to generate a specified phase modulation profile in the electro-optical layer.

In some embodiments, the phase modulation profile is defined as a function that is separable into first and second component functions, which respectively vary along the first and second axes, and the control voltage waveforms applied to the first and second excitation electrodes are specified in accordance with the first and second component functions, respectively. In one embodiment, the first and second component functions are defined in terms of a set of component waveforms that are selected so as to correspond to different, respective phase shifts in the electro-optical layer, such that the phase modulation profile includes a sum of the respective phase shifts due to the first and second component functions at each location within the active area. Typically, the component waveforms have different, respective duty cycles.

Additionally or alternatively, the component waveforms are selected so that the sum of the respective phase shifts making up the phase modulation profile is a modular sum with a modulus of $2n\pi$, wherein n is an integer and may have different, respective values for at least some different pairs of the first and second component functions.

In some embodiments, the control voltage waveforms are selected so that the phase modulation profile contains abrupt phase transitions, and the device functions as a Fresnel lens. The control circuitry can be configured to apply the respective control voltage waveforms with opposite polarities to pairs of mutually-adjacent excitation electrodes in a vicinity of the abrupt phase transitions.

There is moreover provided, in accordance with an embodiment of the invention, optical apparatus, which includes a static lens, including a transparent material having a curved exterior surface with a specified refractive power and an interior surface containing at least first and second overlapping indentations. A dynamic lens is contained in the static lens and has a variable phase modulation profile, which modifies the refractive power of the static lens. The dynamic lens includes an electro-optical layer, as described above, and first and second transparent substrates, which are disposed respectively on the first and second sides of the electro-optical layer and are sized and shaped to fit respectively into the first and second indentations in the static lens, and which include electrodes configured to apply voltages across the electro-optical layer.

Control circuitry is coupled to apply the voltages to the electrodes so as to generate the modulation profile in the electro-optical layer.

In a disclosed embodiment, the control circuitry includes electrical connections disposed at an edge of the first transparent substrate, and the interior surface of the static lens contains a groove into which the electrical connections fit.

There is furthermore provided, in accordance with an embodiment of the invention, a method for producing an optical device. The method includes providing an electro-optical layer, having an effective local index of refraction at any given location within an active area of the electro-optical layer that is determined by a voltage waveform applied across the electro-optical layer at the location. Conductive electrodes are positioned over opposing first and second sides of the electro-optical layer. The electrodes include an array of excitation electrodes, which extend along respective, mutually-parallel axes in a predefined direction across the first side of the electro-optical layer, and which includes at least first and second electrodes having different, respective widths in a transverse direction, perpendicular to the axes. Control circuitry is coupled to apply respective control voltage waveforms to the excitation electrodes so as to generate a specified phase modulation profile in the electro-optical layer.

There is also provided, in accordance with an embodiment of the invention, a method for producing an optical device, which includes providing an electro-optical layer as described above, the electro-optical layer having opposing first and second sides and a layer thickness equal to a distance between the first and second sides. Conductive electrodes are positioned over the first and second sides of the electro-optical layer. The electrodes include an array of excitation electrodes including parallel stripes of a transparent conductive material having gaps between the stripes of a gap width that is less than the layer thickness of the electro-optical layer. Control circuitry is coupled to apply respective control voltage waveforms to the excitation electrodes so as to generate a specified phase modulation profile in the There is additionally provided, in accordance with an embodiment of the invention, a method for producing an optical device, which includes providing an electro-optical layer as described above, and positioning a buffer layer including a transparent dielectric material having a thickness of at least 0.2 µm so that an interior surface of the buffer layer is adjacent to the first side of the electro-optical layer. Conductive electrodes are positioned over the first and second sides of the electro-optical layer. The conductive electrodes include an array of excitation electrodes extending across an exterior surface of the buffer layer, which separates the excitation electrodes from the electro-optical layer. Control circuitry is coupled to apply respective control voltage waveforms to the excitation electrodes so as to generate a specified phase modulation profile in the electro-optical layer.

There is further provided, in accordance with an embodiment of the invention, a method for producing an optical device, which includes providing an electro-optical layer as described above, and positioning a first array of first excitation electrodes to extend along respective, mutually-parallel first axes in a first direction over the active area on a first side of the electro-optical layer. A second array of second excitation electrodes is positioned to extend along respective, mutually-parallel second axes in a second direction, orthogonal to the first direction, over the active area on a second side of the electro-optical layer, opposite the first side. Control circuitry is coupled to apply respective control voltage waveforms to the excitation electrodes and to concurrently modify the respective control voltage waveforms applied to both the first excitation electrodes and the second excitation electrodes so as to generate a specified phase modulation profile in the electro-optical layer.

There is moreover provided, in accordance with an embodiment of the invention, a method for producing an optical device, which includes providing a static lens, including a transparent material having a curved exterior surface with a specified refractive power and an interior surface containing at least first and second overlapping indentations. A dynamic lens is embedded in the static lens, the dynamic lens having a variable phase modulation profile, which modifies the refractive power of the static lens. The dynamic lens includes an electro-optical layer, as described above, and first and second transparent substrates, which are disposed respectively on the first and second sides of the electro-optical layer and are sized and shaped to fit respectively into the first and second indentations in the static lens, and which include electrodes configured to apply voltages across the electro-optical layer. Control circuitry is coupled to apply the voltages to the electrodes so as to generate the modulation profile in the electro-optical layer.

There is furthermore provided, in accordance with an embodiment of the invention, an optical device, including an electro-optical layer as described above, and conductive electrodes extending over opposing first and second sides of the electro-optical layer. The electrodes include an array of excitation electrodes, which extend along respective, mutually-parallel axes in a predefined direction across the first side of the electro-optical layer, while respective center points of the electrodes are displaced transversely by an amount that varies along the respective axes of the electrodes. Control circuitry is coupled to apply respective control voltage waveforms to the excitation electrodes so as to generate a specified phase modulation profile in the electro-optical layer.

In one embodiment, the array of the electrodes on the first side of the electro-optical layer includes a first array of first excitation electrodes, extending in a first direction across the first side of the electro-optical layer, and the conductive electrodes include a second array of second excitation electrodes, which extend in a second direction, perpendicular to the first direction, across the second side of the electro-optical layer, while respective center points of the second excitation electrodes are displaced transversely along the respective axes thereof.

There is also provided, in accordance with an embodiment of the invention, an optical device, including an electro-optical layer as described above, and conductive electrodes extending over the first and second sides of the electro-optical layer. The electrodes including an array of excitation electrodes including parallel stripes of a transparent conductive material. Control circuitry is coupled to apply respective control voltage waveforms to the excitation electrodes so as to generate in the electro-optical layer a specified phase modulation profile containing abrupt phase transitions, while applying the respective control voltage waveforms with opposite polarities to pairs of mutually-adjacent excitation electrodes in a vicinity of the abrupt phase transitions.

In a disclosed embodiment, the control voltage waveforms are selected so as to cause the device to function as a Fresnel lens.

There is additionally provided, in accordance with an embodiment of the invention, a method for producing an optical device. The method includes providing an electro-optical layer, as described above, and positioning conductive electrodes extending over opposing first and second sides of the electro-optical layer. The electrodes include an array of excitation electrodes, which extend along respective, mutually-parallel axes in a predefined direction across the first side of the electro-optical layer, while respective center points of the electrodes are displaced transversely by an amount that varies along the respective axes of the electrodes. Control circuitry is coupled to apply respective control voltage waveforms to the excitation electrodes so as to generate a specified phase modulation profile in the electro-optical layer.

There is further provided, in accordance with an embodiment of the invention, a method for producing an optical device, which includes providing an electro-optical layer, as described above, and positioning electrodes over opposing first and second sides of the electro-optical layer. The electrodes include an array of excitation electrodes including parallel stripes of a transparent conductive material. Control circuitry is coupled to apply respective control voltage waveforms to the excitation electrodes so as to generate in the electro-optical layer a specified phase modulation profile containing abrupt phase transitions, while applying the respective control voltage waveforms with opposite polarities to pairs of mutually-adjacent excitation electrodes in a vicinity of the abrupt phase transitions.

There is moreover provided, in accordance with an embodiment of the invention, optical apparatus, which includes first and second optical devices, which have respective first and second polarization axes and first and second cylinder axes and are arranged in series such that the first and second polarization axes are mutually non-parallel and the first and second cylinder axes are mutually non-parallel. Each of the optical devices includes a polarization-dependent electro-optical layer, having an effective local index of refraction, for light that is polarized along the respective polarization axis and is incident at any given location within an active area of the electro-optical layer, that is determined by a voltage applied across the electro-optical layer at the location. Conductive electrodes extend over opposing first and second sides of the electro-optical layer. The electrodes include an array of excitation electrodes, which is configured to apply respective voltages across the excitation electrodes so as to generate in the electro-optical layer a cylindrical phase modulation profile oriented along the respective cylinder axis. A polarization rotator is positioned between the first and second optical devices so as to rotate a polarization of light that has passed through the first optical device and is parallel to the first polarization axis, in order to align the polarization of the light with the second polarization axis.

In some embodiments, the array of excitation electrodes includes an array of parallel stripes of a transparent, conductive material extending across the first side of the electro-optical layer in a direction parallel to the respective cylinder axis, and the conductive electrodes include a common electrode, positioned over the active area on the second side of the electro-optical layer. Typically, the first and second polarization axes are mutually perpendicular and the first and second cylinder axes are mutually perpendicular.

The present invention will be more fully understood from the following detailed description of the embodiments thereof, taken together with the drawings in which:

BRIEF DESCRIPTION OF THE DRAWINGS

FIG. 2A is a schematic sectional view of an electrically-tunable lens, in accordance with an embodiment of the present invention;

FIG. 2B is a schematic frontal view of electrodes used in the device of FIG. 2A;

FIG. 3A is a schematic frontal view of a compound lens containing static and electrically-tunable components, in accordance with an embodiment of the present invention;

FIG. 3B is a schematic sectional view of the static component of the compound lens of FIG. 3A, taken along the line that is shown in FIG. 3A;

FIG. 3C is a schematic sectional view of the electrically-tunable component of the compound lens of FIG. 3A, taken along the line that is shown in FIG. 3A;

FIGS. 14A and 14B are schematic frontal views of electrodes formed on opposing sides of an electrically-tunable lens, in accordance with an embodiment of the present invention;

FIG. 14C is a schematic frontal view of the device of FIGS. 14A and 14B, showing a superposition of the electrodes on the opposing sides of the device, in accordance with an embodiment of the present invention;

FIG. 15 is a schematic representation of a phase modulation function generated by the device of FIGS. 14A-14C when driven in accordance with an embodiment of the present invention;

FIG. 16 is a plot that schematically illustrates a phase modulation curve of the device of FIGS. 14A-14C as a function of the voltage applied across the electrodes, in accordance with an embodiment of the present invention;

FIG. 20 is a schematic side view of an optical system, in accordance with another embodiment of the invention.

DETAILED DESCRIPTION OF EMBODIMENTS

Overview

Figure 1:
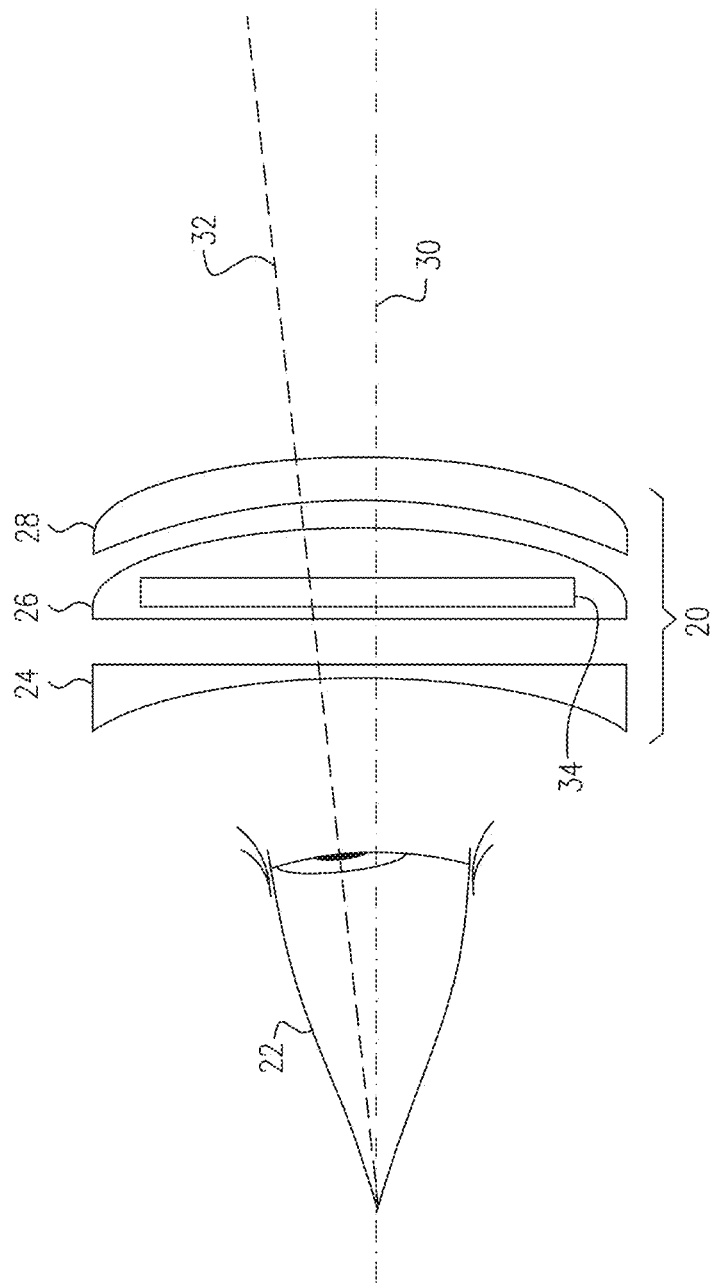
FIG. 1 is a schematic side view of an optical system, in accordance with an embodiment of the present invention.

Electrically-tunable lenses using an electro-optical material with a pixel grid can, in principle, generate any desired phase modulation profile, within the limits of the achievable range of the local refractive index and the pitch of the pixels. Realization of practical lenses for many applications, however, such as for ophthalmic use, requires a large addressable grid of very small pixels, for example, an array of at least 400×400 pixels with a pitch of 50 μm or less.

In liquid-crystal display (LCD) panels, the pixels are typically arranged in a matrix of N rows and M columns. Each of the N*M pixels can receive a set of possible values (gray levels), independent of all other pixels. Different pixel values are obtained by altering the local voltages applied to the liquid crystal (LC) layer. Typically the voltage is time-varying and alternating in sign (AC), in some cases at a rate faster than the LC response time, and the LC responds to the effective average applied voltage as long as the average voltage is above a certain threshold.

Embodiments of the present invention that are described herein provide novel electrically-tunable optical devices that are able to achieve enhanced optical performance relative to devices that are known in the art. The disclosed devices may be configured to operate as cylindrical lenses (with focusing along one axis, using an array of stripe electrodes) or to emulate spherical lenses, with dual-axis focusing. Both the focal power and the location of the optical axis, i.e., the effective central point or axis of the lens defined in this manner, can be changed freely and rapidly by application of appropriate control voltages. The disclosed embodiments build on the principles set forth in the above-mentioned PCT/IB2013/058989, while adding novel and improved features. Devices constructed in accordance with the present embodiments are advantageous particularly in ophthalmic lens systems but may alternatively be used in other applications.

Generally speaking, the disclosed devices (which are referred to herein as electrically-tunable lenses) can be configured to apply any phase modulation profile that is separable. A two-dimensional phase modulation profile $e^{i\phi(x,y)}$ is separable if it can be decomposed into a product of two one-dimensional functions, $e^{i\phi(x,y)} = e^{i\phi_x(x)} \cdot e^{i\phi_y(y)}$. In other words, the disclosed devices are able to apply any phase modulation profile that is defined as a function that is separable into two component functions that vary along respective, mutually-orthogonal axes, and the phase modulation profile will then comprise a sum of the respective phase shifts due to the first and second component functions. As phase is a cyclical function, with period $2\pi$, the term "sum" should be understood in this context as including modular summation, with modulo $2n\pi$, wherein n is an integer. In some embodiments, n may have different, respective values for at least some different pairs of the first and second component functions.

In some of the disclosed embodiments, an optical device comprises an electro-optical layer, meaning, as explained above, that the local effective index of refraction at any given location within the active area of the layer is determined by the voltage applied across the layer in the vicinity of the location. Typically, the electro-optical layer comprises a liquid crystal (LC), possibly a polarization-independent liquid crystal layer (such as a cholesteric LC layer), although other types of electro-optical materials may alternatively be used. A common electrode is positioned over the active area on one side of the electro-optical layer. An array of excitation electrodes, made from a conductive material and having mutually-parallel axes, extends over the active area on the opposite side of the electro-optical layer.

To drive and modify the phase modulation profile of the electro-optical layer, control circuitry applies respective control voltages to the excitation electrodes. Typically, each excitation electrode is individually connected to and controlled by the control circuitry, so that the voltage waveforms applied to several or even all of the excitation electrodes can be modified concurrently. This configuration provides an optical element of arbitrary, tunable one-dimensional profile (such as a cylindrical lens), with a resolution limited only by the distance between the electrodes and the thickness of the electro-optical layer. The phase modulation properties of the device can be modified at a rate limited only by the speed of the control circuitry and the response time of the electro-optical layer.

In some embodiments, two devices of this type are superimposed at right angles, with the excitation electrodes in one device oriented in a direction orthogonal to those in the other device, in order to provide apparatus capable of emulating a spherical lens under the paraxial approximation.

In other embodiments, an optical device comprises an electro-optical layer with first and second arrays of excitation electrodes on opposite sides of the layer, with the second array oriented in a direction orthogonal to the first array. Control circuitry applies respective control voltage waveforms to the excitation electrodes in both arrays and is capable of modifying the control voltages applied to multiple excitation electrodes (and possibly all of the excitation electrodes) on both of the sides of the electro-optical layer. The control circuitry may concurrently modify the respective control voltage waveforms applied to the excitation electrodes in both the first and second arrays so as to generate a specified phase modulation profile in the electro-optical layer.

In these latter embodiments, no time-division multiplexing scheme is required, and both row and column voltage waveforms are data-dependent. The voltage waveforms are chosen to create a linear phase response in the electro-optical material. Formally stated, the term "linear phase response," used in connection with voltage waveforms applied to the electro-optical layer, means that when a set of voltages waveforms $\{V_{X,i}(t)\}_{i=1}^{N}$ is applied to a first set of electrodes, corresponding to a first predefined set of phase values $\{\phi_{X,i}\}_{i=1}^{N}$, and a set of voltage waveforms $\{V_{Y,j}(t)\}_{j=1}^{M}$ is applied to a second set of electrodes, positioned orthogonally to the first set of electrodes, corresponding to a second predefined set of phase values $\{\phi_{Y,j}\}_{j=1}^{M}$, then for each $i=1 \ldots N$ and $j=1 \ldots M$, the phase modulation profile $T_{LC}\{V(t)\}$ for light passing through the electro-optical layer when the voltage waveform V(t) is applied to it will be $T_{LC}\{V_{X,i}(t)-V_{Y,j}(t)\}=e^{i(\varphi_{X,i}+\varphi_{Y,j})}$.

Thus, in distinction to LCD panels that are known in the art, both the X- and Y-axis electrodes are driven with data-dependent voltage waveforms, and all electrodes can be driven concurrently and independently. The term "concurrently," as used in this context, means that the driving waveforms are applied to multiple pixels, in different rows and columns of the array defined by the electrodes, at the same time, without time-division multiplexing. The term "independently" means that a different, data-dependent waveform may be applied to each electrode, along both X- and Y-axes. The control circuitry may apply the respective voltages to different ones of the electrodes at different amplitudes and/or with temporal waveforms, typically having different duty cycles. (The term "duty cycle," as used in the present description and in the claims, refers to the fraction of the time during each period of a given waveform in which the voltage of the waveform is non-zero.)

Some of the embodiments that are described herein are directed at achieving smooth, continuous phase modulation, by reducing sharp phase transitions and diffraction effects that can occur due to the pixelated structure imposed by the electrodes in the device. In addition or alternatively, some of the present embodiments are directed to avoiding ghost images caused by light scattering from periodic structures, such as the pixels of an electronically-tunable lens, by avoiding the use of structures with distinct periods. For example, instead of the uniform stripe electrodes used in devices that are known in the art, in some embodiments of the present invention, the excitation electrodes have different, respective widths (when measured in the transverse direction, perpendicular to the long axes of the electrodes). Different electrodes may have different widths or, in some cases, the widths of at least some of the electrodes vary along the respective axes of the electrodes themselves. Additionally or alternatively, when the phase modulation profile of the device is meant to include abrupt transitions, as in a Fresnel lens profile, these transitions may be made to occur at electrodes with narrow widths, relative to the other electrodes, in order to give sharper, more precise transitions.

Abrupt phase transitions also arise at undesired locations in pixelated lens devices due to the gaps between adjacent electrodes. In some embodiments of the present invention, this problem is addressed by narrowing the gap width, typically to less than the layer thickness of the electro-optical layer, and possibly to less than half the layer thickness. Additionally or alternatively, a buffer layer, comprising a transparent dielectric material, is interposed between the excitation electrodes and the electro-optical layer and thus smooths the phase transitions in the areas of the electro-optical layer that are adjacent to the gaps between the electrodes.

System Description

FIG. 1 is schematic side view of an optical system 20, in accordance with an embodiment of the present invention. In the pictured embodiment, system 20 is configured to function as an ophthalmic lens, which provides dynamic correction for the vision of an eye 22 of a user. This embodiment is just one non-limiting example, however, of possible applications of the principles of the present invention.

System 20 comprises "static" lenses 24, 26 and 28, with a "dynamic" lens 34 embedded in lens 26. Although three static lenses are shown here for the sake of completeness, in many applications only one or two static lenses are required, and it will often be sufficient to use a single static lens, such as lens 26, in which the dynamic lens is embedded. Dynamic lens 34 comprises one or more electrically-tunable optical devices, which may be of any of the suitable forms that are described herein. Lenses 24, 26 and 28 are "static" in the sense that their refractive powers are fixed. Lens 34 is dynamic in that it has a variable phase modulation profile, which modifies the refractive power of optical system 20. Lenses 24, 26 and 28 provide the baseline refractive power of system 20, which is dynamically adjusted by operation of lens 34.

A control unit (not shown) controls dynamic lens 34 so as to tune its optical power and alignment. For example, the optical power may be increased or decreased to accommodate the distance at which eye 22 is attempting to focus. Lens 34 may be set to emulate a spherical lens, possibly with the addition of aspheric components. Additionally or alternatively, lens 34 may function as an astigmatic lens.

As another example, which is illustrated in FIG. 1, the optical center line of dynamic lens 34 may be shifted transversely, so that the optical axis of system 20 shifts from a baseline axis 30 to a deviated axis 32. This sort of axis shift can be applied, possibly in conjunction with tracking of the eye, to dynamically align the optical axis of the system with the user's gaze angle.

More generally speaking, lens 34 can be controlled, by application of appropriate control voltages, to implement substantially any desired phase profile that is separable into horizontal and vertical components, as long as the range of phase shifts in the profile is achievable by the range of refractive index variation and the thickness of the electro-optical layer (or layers) in dynamic lens 34. To reduce the required range of phase shifts, the control voltages may be chosen so that lens 34 operates as a Fresnel lens.

FIGS. 2A and 2B schematically show details of electrically-tunable dynamic lens 34, in accordance with an embodiment of the present invention. FIG. 2A is a sectional view, while FIG. 2B is a frontal view of excitation electrodes 44 used in the lens 34. In this example, excitation electrodes 44 are formed on only one side of an electro-optical layer 48 in lens 34, with a common electrode 46 on the other side, so that the pictured components of lens 34 will function as a dynamic cylindrical lens. In such a case, lens 34 will typically comprise two such cylindrical lenses, with their axes oriented at right angles to one another in order to emulate a two-dimensional lens. Alternatively, lens 34 may comprise two arrays of excitation electrodes on opposing sides the electro-optical layer, as is shown and described in greater detail hereinbelow.

A pair of cylindrical lenses in series may be arranged to emulate a two-dimensional lens in a number of different ways: When the electro-optical layer is polarization-dependent (i.e., modulates light only in a certain polarization), the two cylindrical lenses may be configured and mounted so that their respective polarization axes are mutually parallel, even though the optical cylinder axes are orthogonal. Alternatively, when the first and second cylindrical lenses have non-parallel axes of polarization (for example, with the polarization axes parallel to the respective cylinder axes), an additional optical element is positioned between the two cylindrical lenses in order to rotate the light polarization from the first to the second polarization. This sort of arrangement is shown below in FIG. 20. Of course, if the electro-optical layer is polarization-independent, then no special measures are required in this regard.

Electro-optical layer 48, such as a liquid-crystal (LC) layer, is typically contained by suitable encapsulation, as is known in the art. The encapsulation may include sealing of the sides of the active area, to prevent leakage of the active material. Additionally or alternatively, the encapsulation may include alignment layers on the top and bottom substrates to ensure correct alignment of the molecules of the liquid crystal in the active area. For example, the alignment layer can comprise a thin layer of polyimide with rubbing defining the molecule alignment axis.

Layer 48 has a local effective index of refraction at any given location within its active area (for example, within the area of layer 48 that actually contains the liquid crystal) that is determined by the voltage applied across the layer at that location. The liquid crystal in layer 48 may be birefringent, in which case lens 34 or system 20 may comprise a polarizer, as is known in the art (omitted from the figures for simplicity), in order to select the polarization of the light that is to be passed and refracted by layer 48. Alternatively, to avoid the need for a polarizer, two such lenses can be concatenated with perpendicular axes of birefringence, so that each operates on a different, orthogonal polarization; or a polarization-independent liquid crystal layer, such as a layer of cholesteric liquid crystal material, may be used.

Transparent substrates 40 and 42, such as glass blanks, are positioned on opposing sides of layer 48, and electrodes 44 and 46 are disposed on the substrates. The electrodes typically comprise a transparent, conductive material, such as indium tin oxide (ITO), as is known in the art. Alternatively, non-transparent electrodes may be used, as long as they are thin enough so that they do not cause disturbing optical effects. Common electrode 46 on substrate 42 is positioned over the active area of layer 48 on one side. An array of excitation electrodes 44, comprising stripes of the transparent conductive material on substrate 40 with mutually-parallel axes 49, extends over the active area on the opposite side of layer 48. (Axes 49 of the electrodes run along the long dimension of the electrodes, and "parallel" in this context may include, as well, electrodes that deviate in angle by several degrees.)

The electrode patterns shown in these and the other figures may be formed, for example, by lithography on substrates 40 and 42, after which the substrates are glued together at a predefined distance, typically a few microns, by using glues or etched spacers as are known in the art. Layer 48 is then inserted and sealed in the gap between the substrates. Although for the sake of visual clarity, only a few electrodes 44 are shown in FIG. 2B, in practice, for good optical quality, lens 34 will typically comprise at least 100 stripe electrodes for excitation, and possibly even 400 or more.

Control circuitry 38 is coupled to apply respective control voltages to excitation electrodes 44, relative to the common voltage level of electrode 46. Control circuitry 38 typically comprises amplifiers and/or switches, as are known in the art, which control either the amplitude or the duty cycle, or both, of the voltage that is applied to each electrode 44. The pattern of amplitudes and/or duty cycles applied to the electrodes determines the phase modulation profile of layer 48. The circuit components in circuitry 38 are typically fabricated as a silicon chip, which is then glued onto substrate 40. Alternatively, some or all of the components of circuitry 38 may be formed on a separate chip and connected to substrate 40 by suitable bonding wires or other connections. In either case, the control circuitry can be located at the side of the array of electrodes, as shown in FIG. 2B, and there is no need for any parts of the control circuitry to be located over the active area of layer 48.

Circuitry 38 is able to modify the control voltages applied to each of a set of the excitation electrodes 44 (which may include all of the electrodes) concurrently and independently. For example, circuitry 38 may update the control voltages applied to all the odd electrodes in the array alternately with all the even electrodes. This sort of approach scales readily to large electrode counts, and can thus be used to create electrically-tunable optical systems with high pixel counts and fine resolution.

Electrodes 44 create an array of pixels whose pitch is defined by the center-to-center distance p between the electrodes, as shown in FIG. 2B. The width w of the conductive electrodes themselves defines the size of the pixels, while the gap g between the electrodes influences the separation between the pixels and affects inter-pixel phase deviations. These dimensional parameters of the electrode array are compared to the layer thickness d of electro-optical layer 48, shown in FIG. 2A.

In contrast to most liquid-crystal devices that are known in the art, the inter-electrode distance p of lens 34 is less than four times the thickness d of layer 48, and may be less than twice the thickness. Additionally or alternatively, the gap g between the electrodes may be less than the thickness of layer 48 or possibly even less than half this thickness. In some implementations, even the pitch p may be less than d. This choice of dimensions permits a high effective fill factor of pixels. Furthermore, the relatively thick layer 48 enables lens 34 to generate a large range of different phase shifts, while the small inter-electrode distance supports modulation of the refractive index, and hence the phase shift, with high resolution. The crosstalk between adjacent pixels that results from this choice of dimensions is actually beneficial in smoothing the phase modulation profile of the device, and thus more closely approximating the quadratic profile of a conventional lens. These features are analyzed further hereinbelow.

FIGS. 3A-3C schematically illustrate compound lens 26, which contains a static component 50 and an electrically-tunable component, in the form of lens 34, in accordance with an embodiment of the present invention. FIG. 3A is a frontal view of lens 26, while FIGS. 3B and 3C are schematic sectional views of static component 50 and of the electrically-tunable component, respectively, taken along the line that is shown in FIG. 3A.

Static component 50 is configured as a lens, comprising a transparent material having a curved exterior surface with a specified refractive power. The interior surface of component 50 contains at least two overlapping indentations 56 and 58, of respective depths h1 and h2, as well as a groove 59, in order to accommodate the elements of lens 34. Specifically, the sizes and shapes of indentations 56 and 58 are chosen so that substrates 42 and 40 fit respectively into these indentations. Depth h1 corresponds to the combined thickness of substrate 42 and layer 48, which is enclosed at its sides by sealing 54. Depth h2 is sufficient to contain substrate 40, possibly with an overlying encapsulation layer (not shown). Electrical connections 52 of control circuitry 38 are disposed at the edge of substrate 40 and fit into groove 59. A socket or connecting pads inside groove 59 link connections 52 to a small flexible printed circuit board 53 or other link to external power and input/output circuits (not shown). Alternatively, dynamic lens 34 may have connectors on more than one side, with corresponding grooves 59 formed in both sides of component 50.

The cruciform shape of dynamic lens 34, as defined by substrates 40 and 42, is convenient for mounting in static lens, but other shapes may alternatively be used. For example, in some cases, one of the substrates may be smaller in both dimensions than the other substrate. As another example, at least one side of at least one of the substrates may be rounded, possible fitting the rounded shape of the static lens. Additionally or alternatively, multiple dynamic lenses may be stacked and encapsulated within the same static lens, such as two cylindrical dynamic lenses with perpendicular cylinder axes.

Electrodes of Non-Uniform Width

Figure 4A:
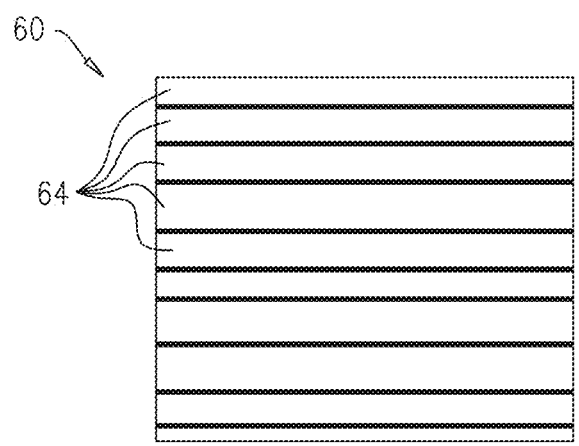
FIGS. 4A and 4B are schematic frontal views of electrodes formed on opposing sides of an electrically-tunable lens, in accordance with an embodiment of the present invention.
Figure 4B:
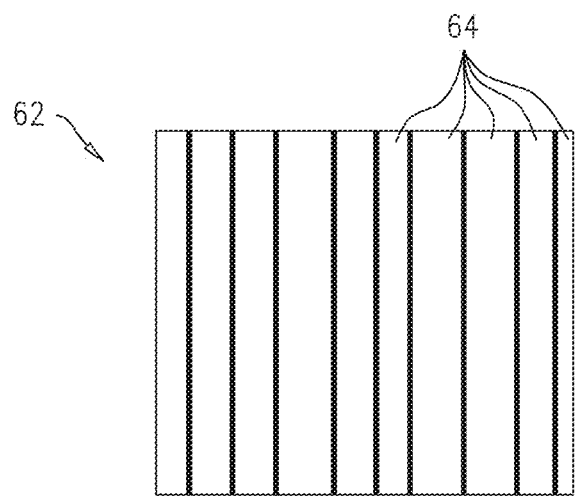
Figure 4C:
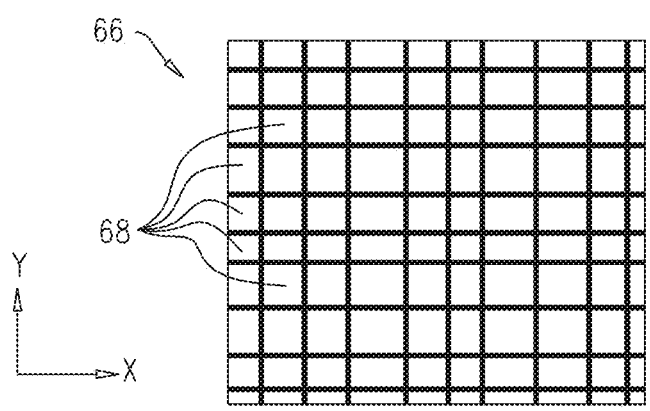
FIG. 4C is a schematic frontal view of the device of FIGS. 4A and 4B, showing a superposition of the electrodes on the opposing sides of the device, in accordance with an embodiment of the present invention.

FIGS. 4A-4C schematically illustrate an electrically-tunable lens 66, in accordance with an embodiment of the present invention. FIGS. 4A and 4B are schematic frontal views of electrodes 64 formed on opposing sides 60 and 62 of the lens. FIG. 4C is a schematic frontal view of lens 66, showing a superposition of electrodes 64 on the opposing sides of the lens. The intersection of the horizontal electrodes on side 60 with the vertical electrodes on side 62 defines an array of pixels 68.

When small pixels of uniform size are used in a lens, for example for vision correction, the regular pitch of the pixels causes substantial diffraction, which can create disturbing ghost images on the retina of the subject. Lens 66 overcomes this problem by using electrodes 64 having different, respective widths in the transverse direction, i.e., the direction perpendicular to their axes. The widths of the successive electrodes are randomized with a predefined standard deviation around a given mean. The inventors have found that when the widths of the electrodes differ from one another with a standard variation that is at least 10% of the mean width taken over all the electrodes, diffraction effects are suppressed sufficiently to make the ghost images nearly imperceptible. When the standard deviation of the width is 20% or greater, the ghost images disappear almost entirely. Although lens 66 comprises two arrays of mutually-perpendicular electrodes 64, the principles of this embodiment (as well as the embodiments that follow) are equally applicable, mutatis mutandis, to electrically-tunable lenses that comprise only a single electrode array.

FIGS. 5A-5D are plots that schematically show the point spread functions (PSF) of retinal images formed using lens 66 (as shown in FIGS. 4A-4C) for different levels of pixel size variation, in accordance with an embodiment of the present invention. To compute the PSF, the eye is assumed to be a perfect lens, with a focal length of 17 mm and a pupil size of 4 mm, while lens 66 has an average pixel pitch of 10 µm and is driven to operate as a Fresnel lens with a focal length of 1 m. The optical axis of the eye is assumed to be displaced by 5 mm relative to the center of lens 66, which tends to exacerbate the diffraction effects.

Figure 5B:
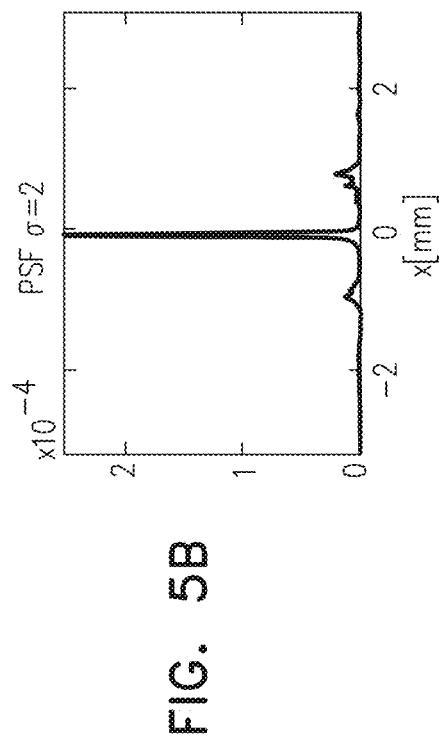
FIGS. 5A-5D are plots that schematically show the point spread functions of retinal images formed using the device of FIGS. 4A-4C for different levels of pixel size variation, in accordance with an embodiment of the present invention.
Figure 5D:
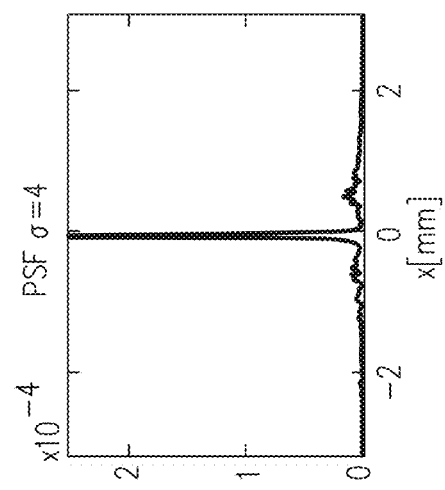
Figure 5A:
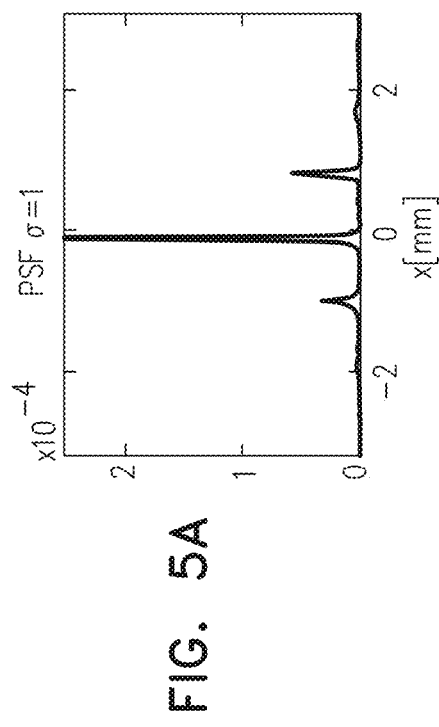
Figure 5C:
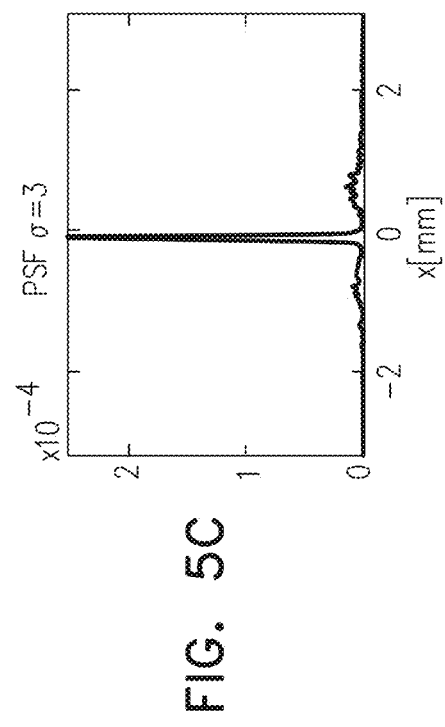

Each of FIGS. 5A-5D shows the amplitudes of the diffraction orders in the scheme defined above for different standard deviations, $\sigma$, expressed in microns, of the electrode widths. FIGS. 5A-5D are scaled to emphasize high diffraction orders, and the zero-order peak value, which is not seen in the figures, is 0.02. For $\sigma=1$ µm, meaning a standard deviation of 10%, as shown in FIG. 5A, the first diffraction orders are reduced to less than 0.3% of the zero order and are thus barely perceptible, if at all. For higher standard deviations, the first diffraction orders are reduced further still. The total scattered light is not reduced and may even increase slightly with increasing standard deviation, but this scatter does not disturb the subject's vision in any way.

Figure 6A:
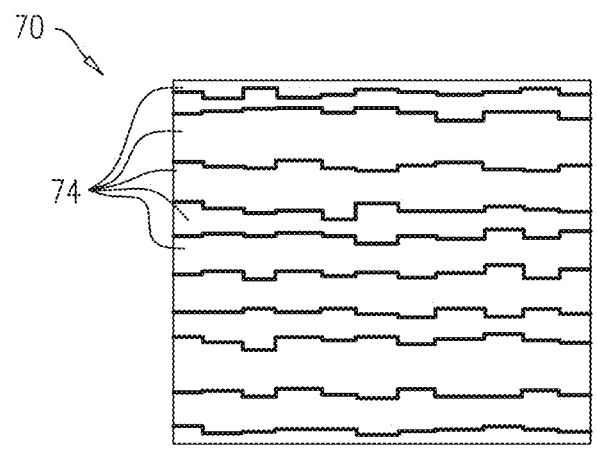
FIGS. 6A and 6B are schematic frontal views of electrodes formed on opposing sides of an electrically-tunable lens, in accordance with another embodiment of the present invention.
Figure 6B:
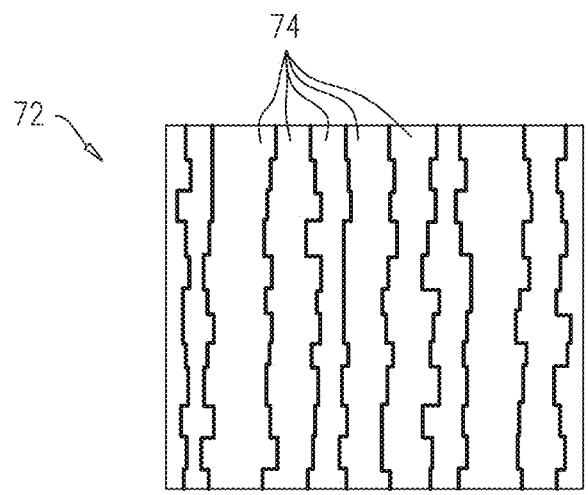
Figure 6C:
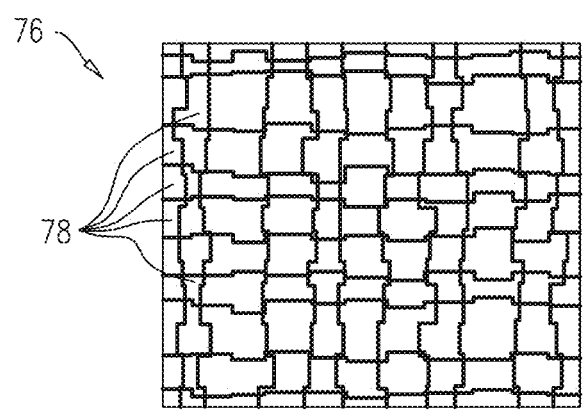
FIG. 6C is a schematic frontal view of the device of FIGS. 6A and 6B, showing a superposition of the electrodes on the opposing sides of the device, in accordance with an embodiment of the present invention.

FIGS. 6A-6C schematically illustrate an electrically-tunable lens 76, in accordance with an alternative embodiment of the present invention. FIGS. 6A and 6B are schematic frontal views of electrodes 74 formed on opposing sides 70 and 72 of the lens. FIG. 6C is a schematic frontal view of lens 76, showing a superposition of electrodes 74 on the opposing sides of the lens. The intersection of the horizontal electrodes on side 70 with the vertical electrodes on side 72 defines an array of pixels 78.

As can be seen in FIGS. 6A and 6B, the widths of electrodes 74 not only differ from one another, but also vary along the axes of the electrodes. (The axes of electrodes 74 are taken to be the centroidal axes along the long dimensions of the electrodes, which are parallel to within a small deviation.) Consequently both the sizes and shapes of pixels 78 vary over the area of lens 76, and diffraction effects are negligible. Although the size variations in FIG. 6C are substantial, for clarity of illustration, in practical implementations the variations will typically be smaller to enable accurate generation of the desired phase modulation profile. The width variations of electrodes 74 may alternatively be smooth, rather than periodic with random amplitude as shown in the present figures.

Figure 7A:
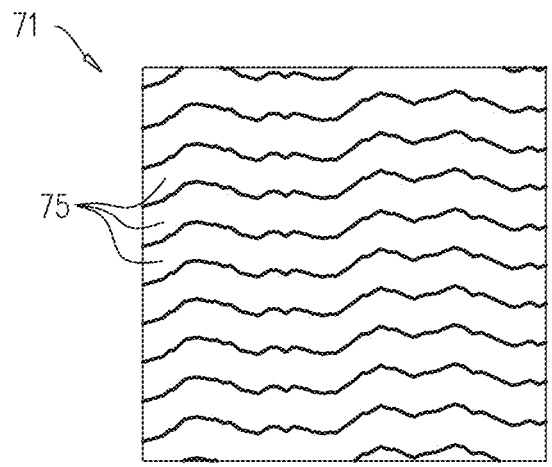
FIGS. 7A and 7B are schematic frontal views of electrodes formed on opposing sides of an electrically-tunable lens, in accordance with an alternative embodiment of the present invention.
Figure 7B:
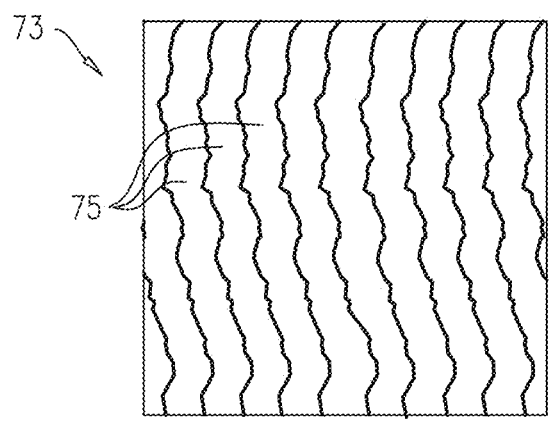
Figure 7C:
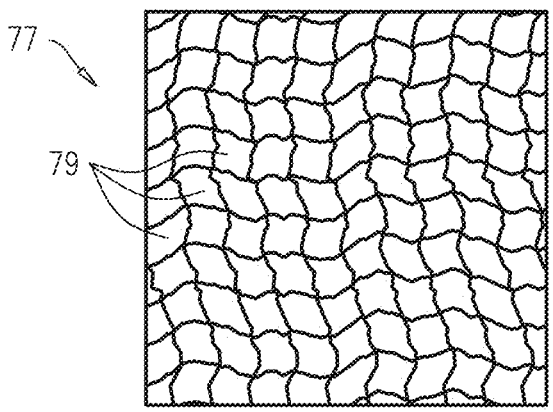
FIG. 7C is a schematic frontal view of the device of FIGS. 7A and 7B, showing a superposition of the electrodes on the opposing sides of the device, in accordance with an embodiment of the present invention.

FIGS. 7A-7C schematically illustrate an electrically-tunable lens 77, in accordance with an alternative embodiment of the present invention. FIGS. 7A and 7B are schematic frontal views of electrodes 75 formed on opposing sides 71 and 73 of the lens. FIG. 7C is a schematic frontal view of lens 77, showing a superposition of electrodes 75 on the opposing sides of the lens. The intersection of the horizontal electrodes on side 71 with the vertical electrodes on side 73 defines an array of pixels 79.

As can be seen in FIGS. 7A and 7B, the widths of electrodes 75 are roughly constant, but their center points are displaced transversely by an amount that varies along the respective axes of the electrodes, which are again taken to be the centroidal axes along the long dimensions of the electrodes. In this example, the transverse displacement of all the electrodes is the same for any given distance measured along the axes from the edge of side 71 or 73, so that constant electrode width is maintained, but alternatively, the widths and displacements of the electrodes may vary. The varying transverse displacement of the electrodes introduces a corresponding variation in the pitch of pixels 79 in the spatial Fourier transform of lens 77, thus mitigating the diffraction peaks and ghost images that would otherwise be produced.

Although FIGS. 6A-6C and 7A-7C show lenses 76 and 77 with arrays of electrodes 74 or 75 extending across both sides, the principles of these embodiments may similarly be implemented in cylindrical lenses, in which the electrodes of non-uniform width and/or displacement extend over only one side of the electro-optical layers. A pair of such cylindrical lenses, with the electrode axes of the two lenses perpendicular to one another, can be used to achieve substantially the same focusing effect as in lens 74 or 75.

To maintain smoothness in the area between electrodes, the waveforms that are applied by control circuitry 38 to drive adjacent electrodes should generally be of the same polarity. An exception to this rule occurs when there are abrupt transitions in the phase modulation profile, such as in Fresnel lenses: In this case, the control circuitry may apply the respective control voltage waveforms with opposite polarities to pairs of mutually-adjacent excitation electrodes in the vicinity of the abrupt phase transitions, in order to achieve a steeper change in the phase modulation profile.

Additionally or alternatively, abrupt transitions in the phase modulation profile of the electro-optical layer can be sharpened by driving the electrodes at either side of the transition with voltages that overshoot or undershoot the nominal voltage for the given phase modulation amplitude. When wide electrodes are used, however, as described above, the overshoot and undershoot over the correspondingly wide areas in the electro-optical layer may have a negative impact on the focal quality of the lens. This problem can also be addressed by using electrodes having different, respective widths, as illustrated in the figures that follow. The features of these embodiments may be combined with those of the preceding embodiments, and may be implemented in devices that include either a single array of excitation electrodes on one side of the electro-optical layer or two, mutually-perpendicular arrays on opposing sides.

Figure 8:
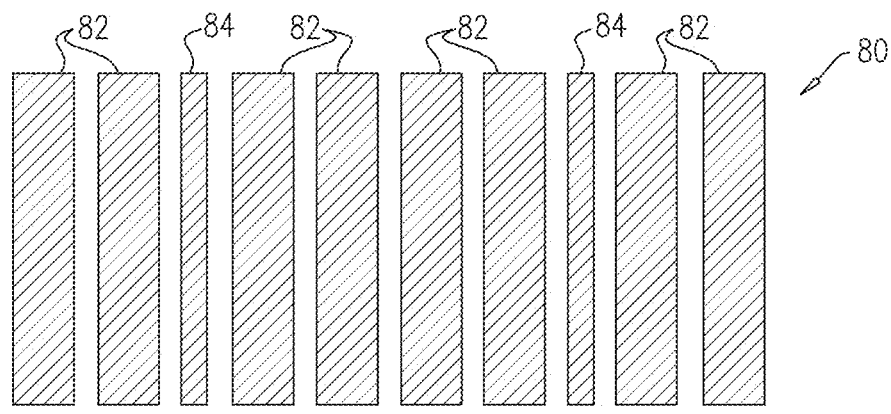
FIG. 8 is a schematic frontal view of electrodes in an electrically-tunable lens, in accordance with an embodiment of the present invention.

FIG. 8 is a schematic frontal view of electrodes 82, 84 in an electrically-tunable lens 80, in accordance with such an embodiment of the present invention. The design of lens 80 incorporates narrow electrodes 84 interspersed with main modulation electrodes 82. Typically, the width of electrodes 84 is no more than half the width of electrodes 82, and may be still less. In fact, the width of electrodes 84 may be no greater than four times the widths of the gaps between the electrodes, or possibly even equal to or less than the gap width. This electrode width may be less than the thickness of the electro-optical layer itself.

The control voltage waveforms applied by the control circuitry are adjusted so that the abrupt transitions in the phase modulation profile will occur in the vicinity of narrow electrodes 84. The narrow electrodes are driven with overshoot or undershoot voltages, as appropriate, in order to sharpen these transitions. Because of the narrow stripe width, however, the overshoot or undershoot is limited to a narrow spatial band at the phase transition border, while the remainder of the profile that is generated by main electrodes 82 remains smooth and well formed.

In some embodiments of the present invention, when a phase modulation function with abrupt phase transitions, such as a Fresnel lens, is implemented in a structure such as that shown in FIG. 8, the range of phase modulation values supported by the electro-optical layer is increased in proportion to a relation between the density of narrow electrodes 84 relative to the spacing between the abrupt transitions in the phase modulation function. A high density of narrow electrodes results in a smaller increase of the required range of phase modulation values. For example, a Fresnel prism, with abrupt phase transitions of $2\pi$ that are spaced a distance X apart, can be implemented using an electro-optical layer supporting phase modulation values of 0 to $2\pi$ as long as the electrode structure supports abrupt transitions from $2\pi$ to 0 that are spaced X apart. In practical cases, however, in which the abrupt transitions are limited to the locations of narrow electrodes 84, and there is not a complete overlap between the locations of the narrow electrodes and the abrupt transitions of the phase modulation function, the electro-optical layer should support a modulation range greater than $2\pi$. For instance, if the distance between narrow electrodes is 0.3x, some of the abrupt transitions will have to be spaced 1.2x apart in order to match the narrow electrode locations (and in other places 0.9x apart). In such cases, the phase modulation range of the electro-optical layer should be 20% larger, covering the range of 0 to $2.4\pi$. If the narrow electrodes are spaced 2x apart, abrupt transitions will also be 2X apart, and the active layer should then support a phase modulation range of 0 to $4\pi$.

Figure 9:
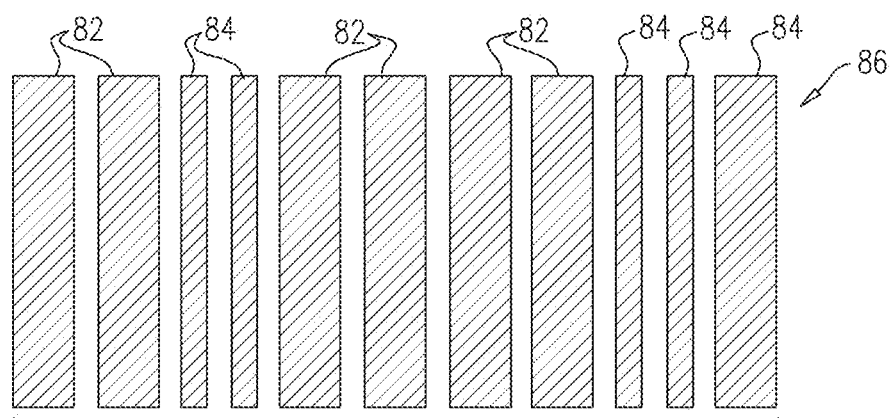
FIG. 9 is a schematic frontal view of electrodes in an electrically-tunable lens, in accordance with another embodiment of the present invention.

FIG. 9 is a schematic frontal view of electrodes 82, 84 in an electrically-tunable lens 86, in accordance with an alternative embodiment of the present invention. This embodiment is similar to that of FIG. 8, except that in lens 86, narrow electrodes 84 are paired in order to enable more precise local control of the applied waveforms and phase modulation profile. In this case, one of the narrow electrodes in the pair may be driven with an overvoltage, while the other receives an undervoltage.

Figure 10:
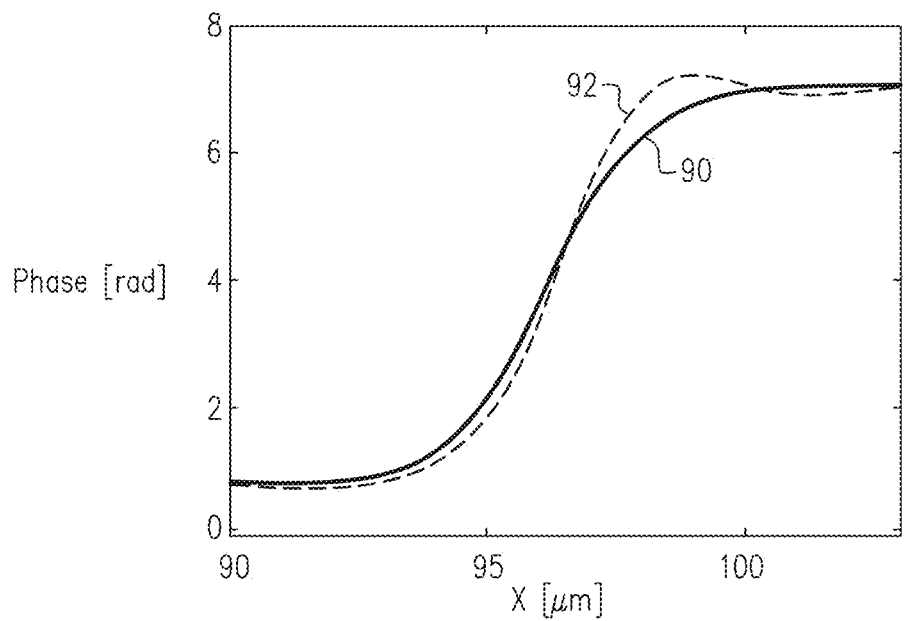
FIG. 10 is a plot that schematically shows variation in phase modulation between pixels in the device of FIG. 8 and in a device having pixels of uniform width, in accordance with an embodiment of the present invention.

FIG. 10 is a plot that schematically shows variation in phase modulation in two electrically-tunable lenses, in accordance with an embodiment of the present invention. A solid curve 90 shows a transition of $2\pi$ in the phase modulation profile of a lens with electrodes of uniform width, while a dashed curve 92 shows the sharper transition that is achieved using narrow electrodes 84, as in the device of FIG. 8. The gap between the electrodes in both cases is g=2 µm, and electrodes 84 are 2 µm wide. The electrodes are driven with a pulse-width modulated (PWM) signal of amplitude 3.3 V. The low-phase electrodes, on the left side of FIG. 10, have a 5% duty cycle ($V_{ms}$=0.74 V), while the high-phase electrodes, on the right side, have a 20% duty cycle ($V_{ms}$=1.47 V). To generate curve 92, electrode 84 at the high side of the transition is driven with an overshoot voltage, with 26% duty cycle ($V_{ms}$=1.68 V). The $2\pi$ transition in the phase modulation function is visibly steeper when using narrow electrode 84 with voltage overshoot in this manner.

Avoiding Undesired Phase Variations

Referring back to FIGS. 2A and 2B, the most fundamental parameter of a pixelated electrically-tunable lens is the pitch p, which determines the spatial sampling rate of the modulation function. The pitch should be small enough to ensure that the phase modulation function does not change significantly between pixels.

The gap width g between the electrodes is also important for achieving smooth, continuous modulation functions, and should not be much larger than the thickness d of the electro-optical layer. If g>>d, the electrical field applied to the electro-optical material under the gap between the electrodes is significantly smaller than that below the electrodes, resulting in significant discontinuities in the light modulation function. It is therefore desirable that the gap width g be less than the layer thickness d of the electro-optical layer, and even less than half the layer thickness if possible.

Figure 11:
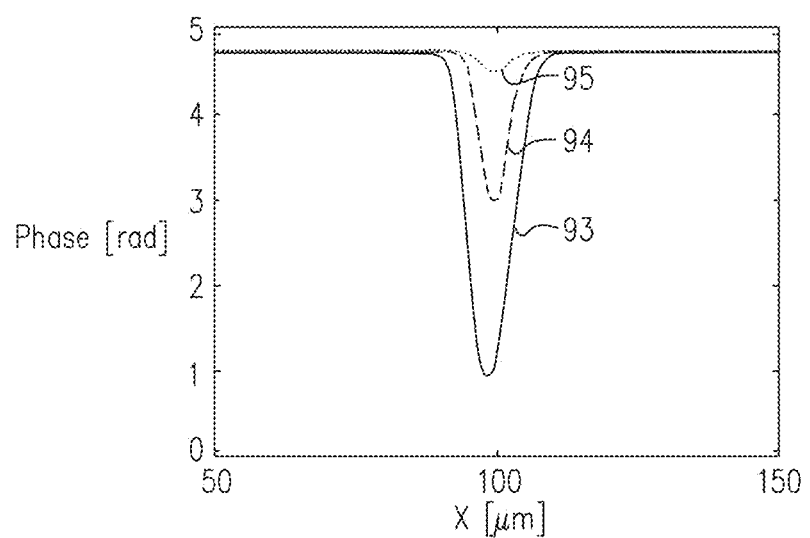
FIG. 11 is a plot that schematically shows variations in phase modulation between adjacent electrodes of an electrically-tunable lens for different gap widths between the electrodes, in accordance with an embodiment of the present invention.

FIG. 11 is a plot that schematically shows variations in phase modulation between adjacent electrodes of an electrically-tunable lens for different gap widths between the electrodes, in accordance with an embodiment of the present invention. The required phase modulation is constant at 4.7 radians, and therefore the same voltage is applied to the two electrodes on either side of the gap. The thickness of the liquid crystal layer is taken to be d=5 µm. Curves 93, 94 and 95 show the phase change within the liquid crystal adjacent to the gap between the electrodes for gap widths g=10 µm, g=5 µm, and g=2 µm, respectively.

Curves 93, 94 and 95 clearly illustrate the advantage of having a small gap width when a smooth, continuous phase modulation function is required. In curve 93, with gap width larger than the electro-optical layer thickness, the phase modulation drops from the required 4.7 to only 0.9 radians between the electrodes. In curve 94, with the gap width equal to the layer thickness, the drop in phase modulation is less extreme, whereas in curve 95, for which the gap width is less than half the layer thickness, the phase modulation drops only to 4.5 radians. Thus, it is beneficial in most cases to use the smallest gap achievable under the given manufacturing limitations (such as the feature size of the photolithography process).

Figure 12:
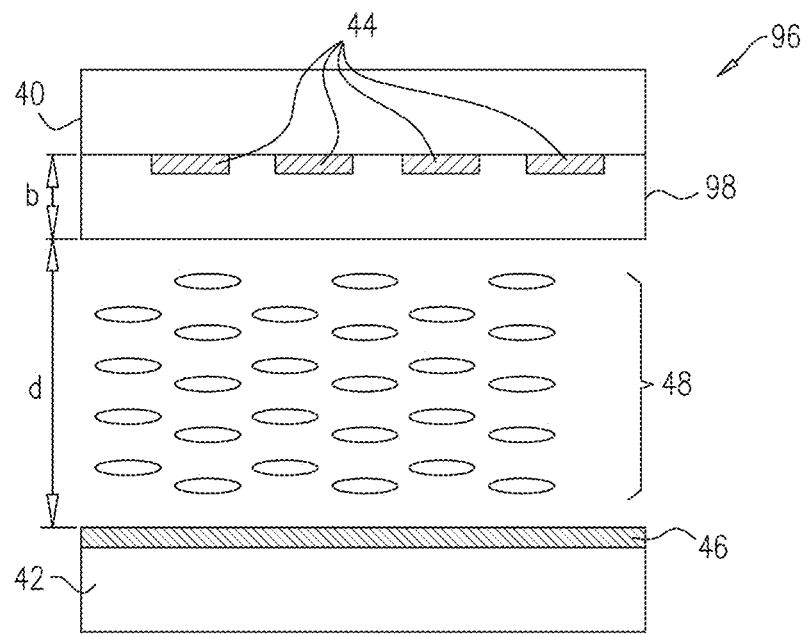
FIG. 12 is a schematic sectional view of an electrically-tunable lens comprising a buffer layer between the electrodes and a liquid crystal in the lens, in accordance with an alternative embodiment of the present invention.

FIG. 12 is a schematic sectional view of an electrically-tunable lens 96 comprising a buffer layer 98 between electrodes 44 and electro-optical layer 48 in the lens, in accordance with an alternative embodiment of the present invention. Buffer layer 98 comprises a transparent dielectric material, such as glass or a suitable polymer, typically at least 0.2 µm thick, and in most cases at least 0.5 µm thick, which separates the excitation electrodes from the electro-optical layer. The interior surface of buffer layer 98 is adjacent to one side of electro-optical layer 48, while electrodes 44 on substrate 40 extend across the exterior surface of the buffer layer. In the pictured embodiment, common electrode 46 on substrate 42 extends across the active area of electro-optical layer 48. If an electrode pattern exists on substrate 42 as well, however, an additional buffer layer (not shown) can be positioned on top of the bottom substrate, similar to layer 98.

The areas where the electric field in electro-optical layer 48 is most affected by the gaps between electrodes 44, resulting in the undesired modulation variations shown in FIG. 11, are adjacent to the gaps, near substrate 40. Buffer layer 98 distances the electro-optical material in layer 48 from these areas and for this purpose should have a thickness that is at least one-fourth of the gap width. Therefore, the electro-optical material experiences a smoother electrical field, and the phase modulation is smoother.

Figure 13:
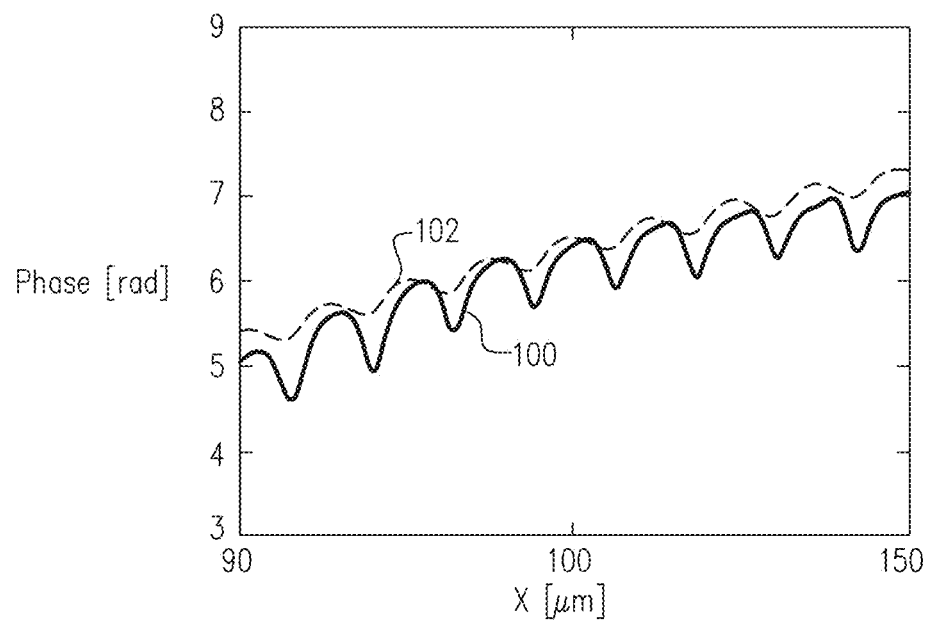
FIG. 13 is a plot that schematically shows variation in phase modulation between pixels in the device of FIG. 12 and in a device without a buffer layer, in accordance with an embodiment of the present invention.
Figure 17A:
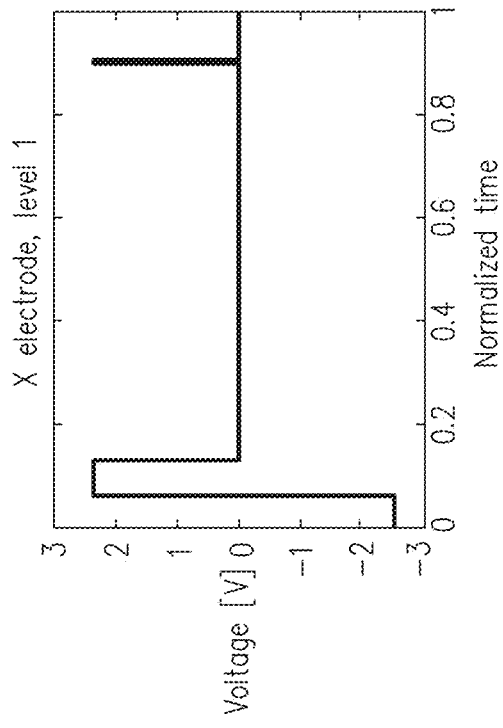
FIGS. 17A-17D are plots that schematically illustrate voltage waveforms applied to the electrodes of FIG. 14A, in accordance with an embodiment of the present invention.
Figure 17B:
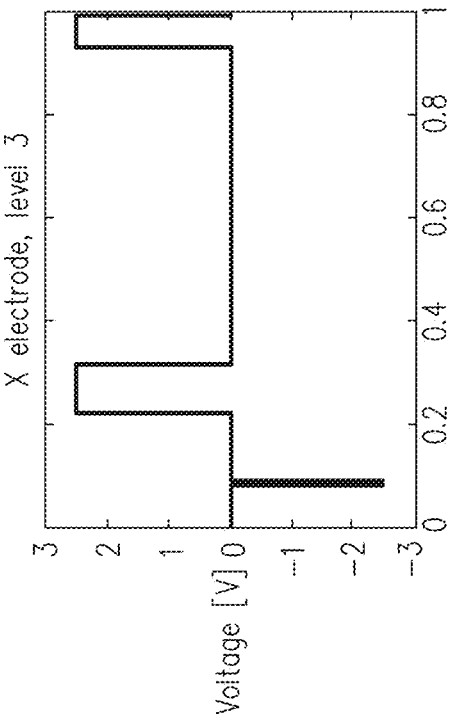
Figure 17C:
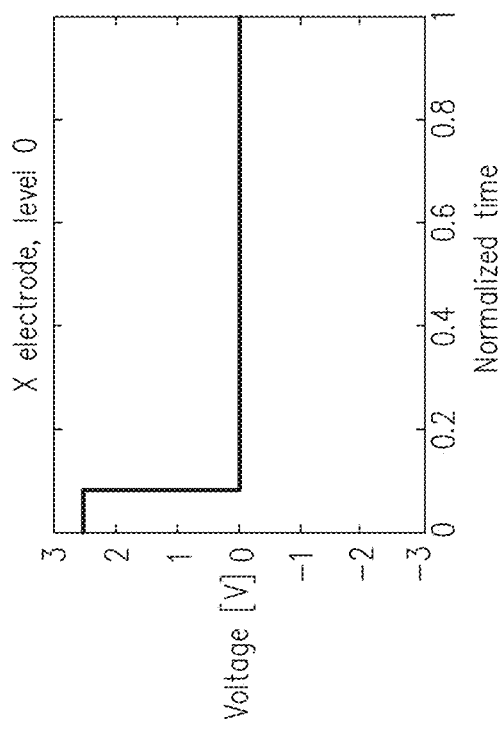
Figure 17D:
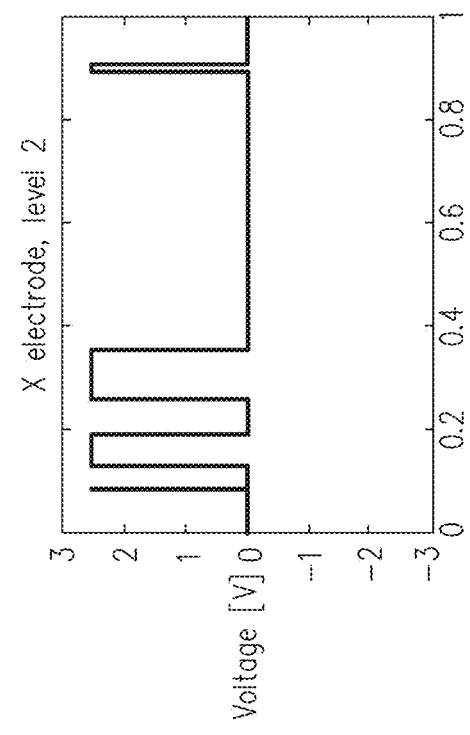
Figure 18A:
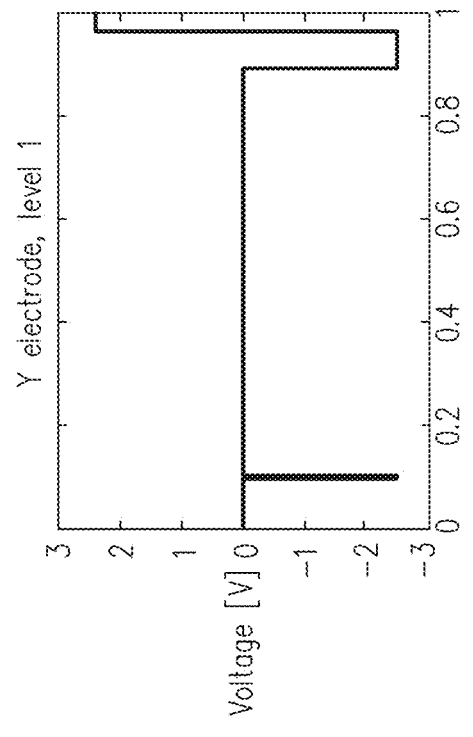
FIGS. 18A-18D are plots that schematically illustrate voltage waveforms applied to the electrodes of FIG. 14B, in accordance with an embodiment of the present invention.
Figure 18B:
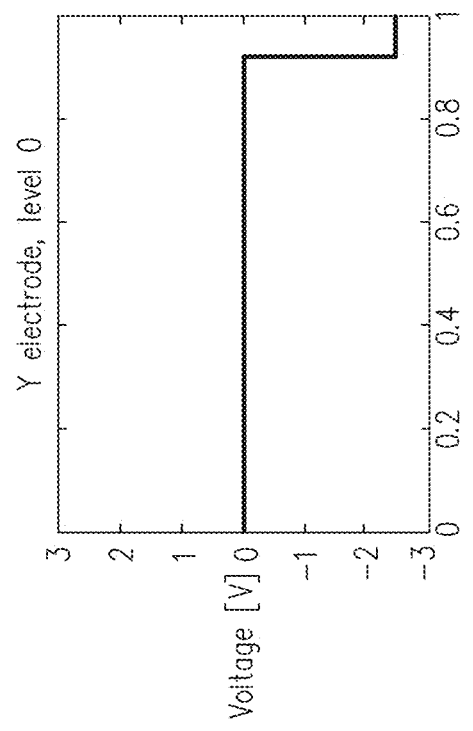
Figure 18C:
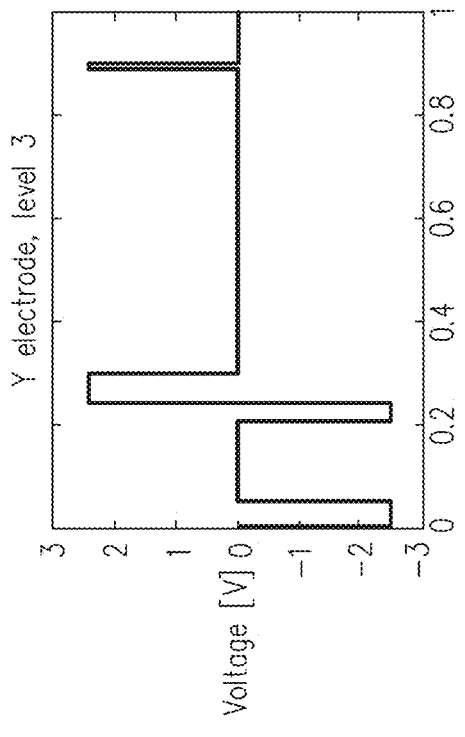
Figure 18D:
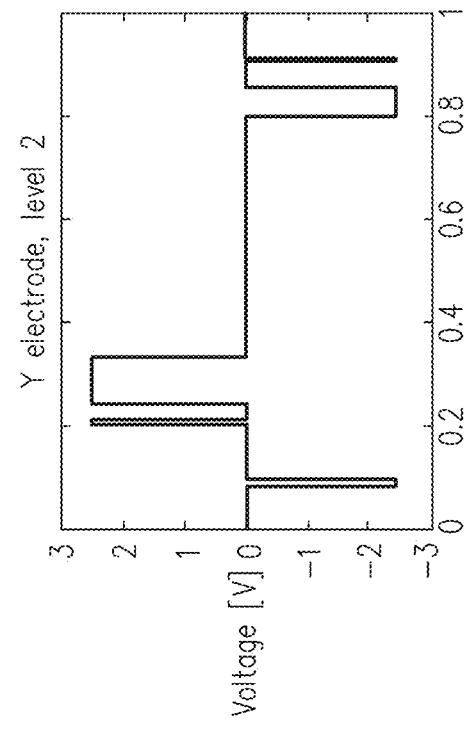
Figure 19B:
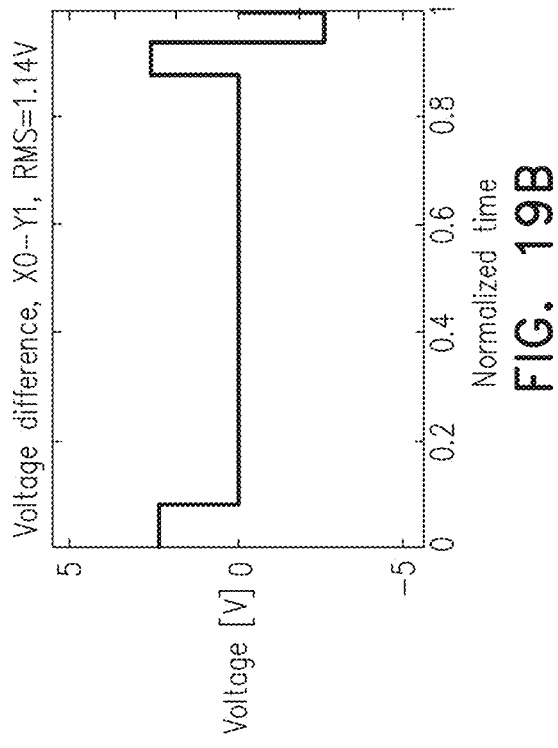
FIGS. 19A-19G are plots that schematically illustrate voltage waveforms generated across the liquid crystal in an electrically-tunable lens as a result of applying different combinations of the waveforms of FIGS. 17A-17D and FIGS. 18A-18D to the electrodes.
Figure 19D:
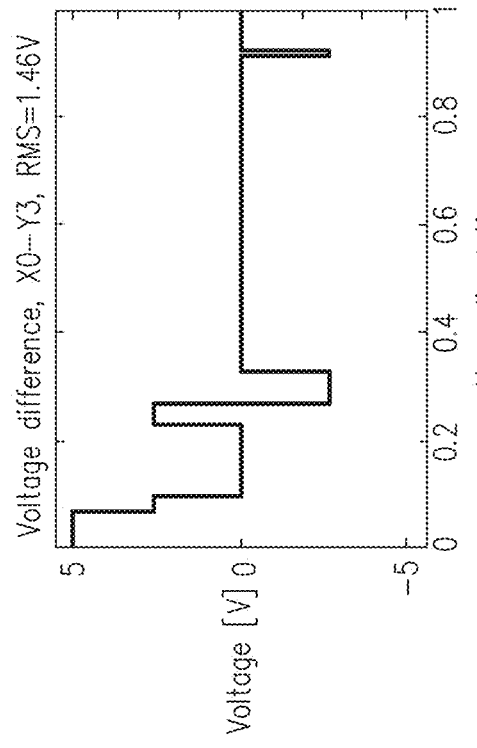
Figure 19A:
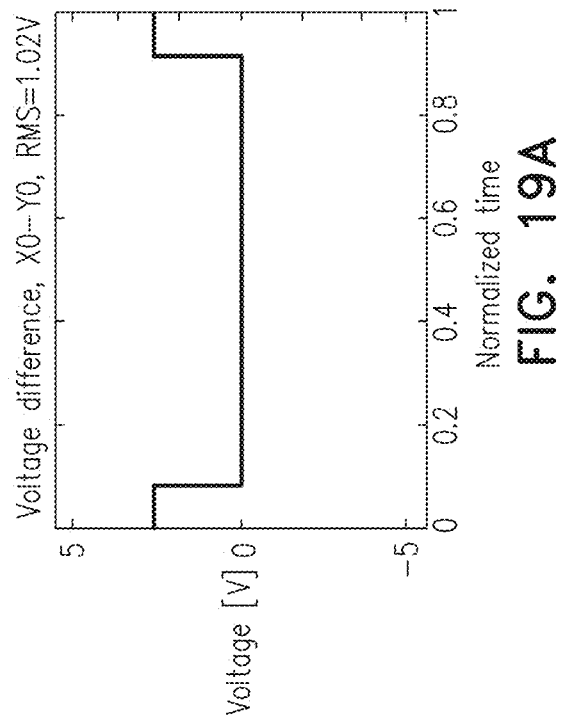
Figure 19C:
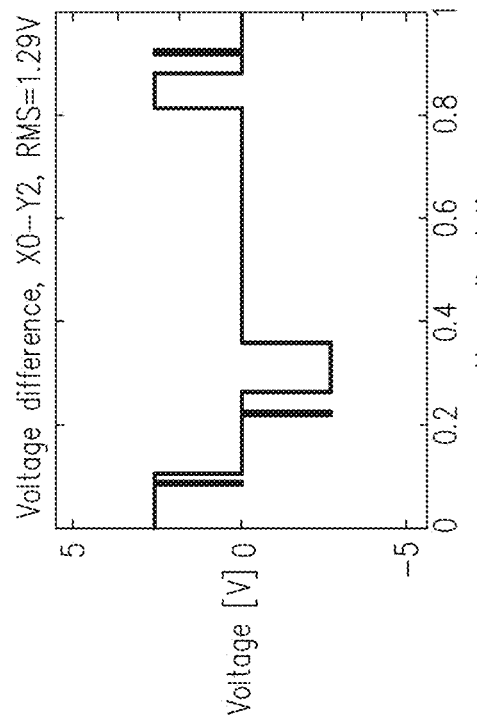
Figure 19F:
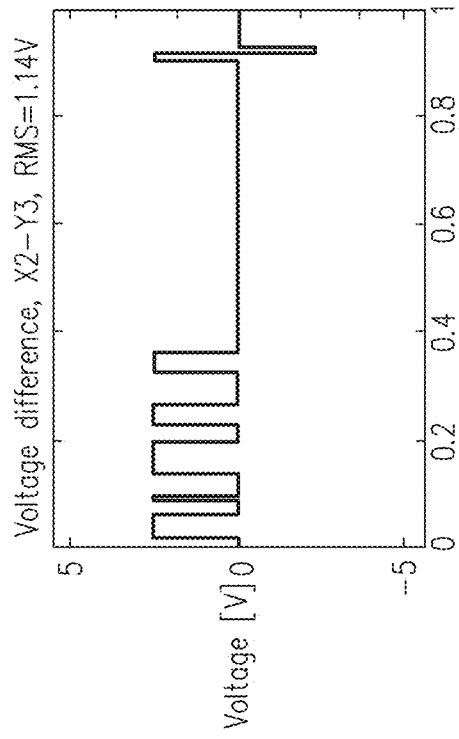
Figure 19G:
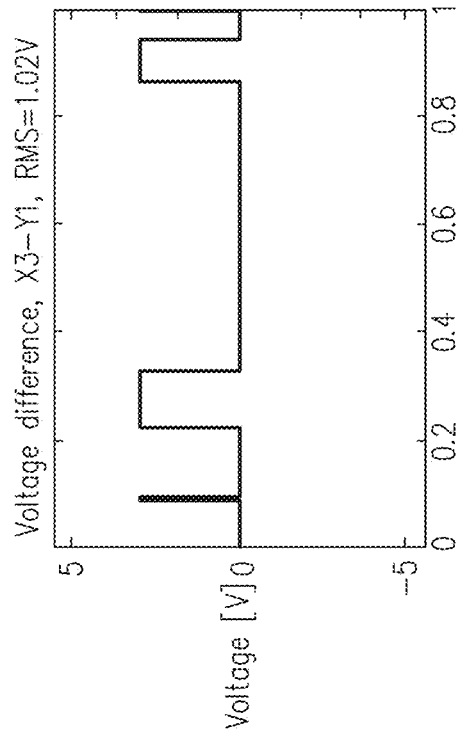
Figure 19E:
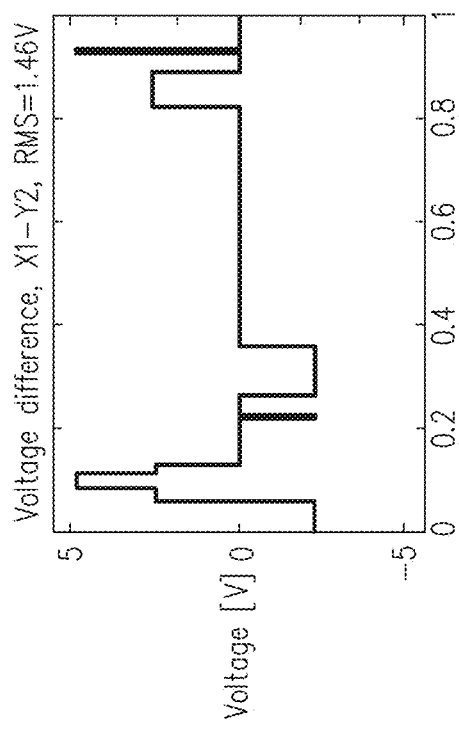

FIG. 13 is a plot that schematically shows variation in phase modulation between pixels in lens 96 and in a comparable lens without a buffer layer, in accordance with an embodiment of the present invention. In this example, the thickness of electro-optical layer 48 is d=5 µm, while electrodes 44 have width w=9 µm and are separated by gaps of width g=3 µm. A curve 100 shows the phase variations in layer 48 without a buffer layer, while a curve 102 shows the phase variations with the addition of a buffer layer 98 of thickness b=1 µm. The buffer layer smooths the light modulation function and achieves more continuous modulation.

On the other hand, the buffer layer will also smooth the $2n\pi$ abrupt phase transitions in Fresnel-type profiles, thus increasing the modulation errors in these areas. These errors can be reduced by positioning additional narrow electrodes on the side of buffer layer 98 that is directly adjacent to electro-optical layer 48 (the lower side in FIG. 12). These latter electrodes may be used in implementing steep modulation changes in the manner described above with reference to FIGS. 7-9.

Driving Waveforms for Separable Modulation Functions

FIGS. 14A-14C schematically illustrate an electrically-tunable lens 112, which is used in generating phase modulation profiles that are separable in the X- and Y-directions, in accordance with an embodiment of the present invention. FIGS. 14A and 14B are schematic frontal views of electrodes 110 formed on opposing sides 106 and 108, respectively, of the electro-optical medium in lens 112 (not shown in these figures). FIG. 14C is a schematic frontal view of lens 112, showing a matrix of pixels 114 defined by the superposition of electrodes 110 on the opposing sides of the device.

As noted earlier, lens 112 can be driven to implement phase modulation profiles $e^{i\phi(x,y)}$ that are separable, meaning that they can be decomposed into a product of two one-dimensional functions, $e^{i\phi(x,y)} = e^{i\phi_x(x)} \cdot e^{i\phi_y(y)}$. In other words, the separable phase modulation function is decomposed into two one-dimensional phase modulation functions: $\phi(x,y)=\phi_X(x)+\phi_Y(y)$. The one-dimensional functions can be quantized to N quantization levels of the phase angle θ, for example $$\theta_k = \frac{k}{N}\theta_{max},$$

k=0 ... N−1. Thus, in some embodiments of the present invention, respective voltage waveforms $V_{x,k}(t)$ and $V_{y,k}(t)$ for the X- and Y-axis electrodes 110, on sides 106 and 108 of lens 112, are defined corresponding to these quantization levels, such that for every pair of levels $(k_1,k_2)$, applying $V_{x,k_1}(t)$ to a vertical electrode and $V_{y,k_2}(t)$ to a horizontal electrode will result in a phase modulation of $\theta=\theta_0+\theta_{k_1}+\theta_{k_2}$ in the pixel 114 at the intersection of the electrodes. In this expression, $\theta_0$ is a constant phase common to all pixels, which does not affect the light propagation through lens 112.

For example, Table I below shows the phase modulation of a pixel as a function of the applied voltage waveforms on the vertical and horizontal electrodes defining the pixel, assuming quantization to four phase modulation levels, $$\theta_k = \frac{k\pi}{2},$$

k=0 ... 3:

TABLE 1

| | Y | | | |
|---|---|---|---|---|
| X | $V_{y,0}(t)$ | $V_{y,1}(t)$ | $V_{y,2}(t)$ | $V_{y,3}(t)$ |
| $V_{x,0}(t)$ | $\theta_0$ | $\theta_0 + \pi/2$ | $\theta_0 + \pi$ | $\theta_0 + 3\pi/2$ |
| $V_{x,1}(t)$ | $\theta_0 + \pi/2$ | $\theta_0 + \pi$ | $\theta_0 + 3\pi/2$ | $\theta_0 + 2\pi$ |
| $V_{x,2}(t)$ | $\theta_0 + \pi$ | $\theta_0 + 3\pi/2$ | $\theta_0 + 2\pi$ | $\theta_0 + 5\pi/2$ |
| $V_{x,3}(t)$ | $\theta_0 + 3\pi/2$ | $\theta_0 + 2\pi$ | $\theta_0 + 5\pi/2$ | $\theta_0 + 3\pi$ |

In another embodiment of the present invention, the voltage waveforms $V_{x,k}(t)$ and $V_{y,k}(t)$ are defined in a way that enables more efficient modulation by reducing the dynamic range of the phase modulation. Specifically, the voltage waveforms $V_{x,k}(t)$ and $V_{y,k}(t)$ are defined such that for any $(k_1,k_2)$, applying $V_{x,k_1}(t)$ on a vertical electrode and $V_{y,k_2}(t)$ on a horizontal electrode will result in a phase modulation of $\theta_{k_1,k_2}=\theta_0+\theta_{k_1}+\theta_{k_2}-2\pi l_{k_1,k_2}$, wherein $l_{k_1,k_2}$ is a non-negative integer. A simple example of this sort of function is modular phase addition, as given by $\theta_{k_1,k_2}=(\theta_0+\theta_{k_1}+\theta_{k_2})$ mod $2n\pi$. As noted earlier, the value of the integer n need not be constant and may vary for different pairs of component waveforms.

As a result of this approach, thinner electro-optical layers can be used, enabling steeper phase transitions when abrupt changes are required. Alternatively, this sort of approach can be used to decrease the number of phase discontinuities in the modulation function.

Table II illustrates this approach for four quantization levels (as in Table I), with n=1, i.e., $\theta_{k_1,k_2}=(\theta_0+\theta_{k_1}+\theta_{k_2})$ mod $2\pi$:

TABLE II

| X | Y | | | |
|---|---|---|---|---|
|   | $V_{y,0}(t)$ | $V_{y,1}(t)$ | $V_{y,2}(t)$ | $V_{y,3}(t)$ |
| $V_{x,0}(t)$ | $\theta_0$ | $\theta_0 + \pi/2$ | $\theta_0 + \pi$ | $\theta_0 + 3\pi/2$ |
| $V_{x,1}(t)$ | $\theta_0 + \pi/2$ | $\theta_0 + \pi$ | $\theta_0 + 3\pi/2$ | $\theta_0$ |
| $V_{x,2}(t)$ | $\theta_0 + \pi$ | $\theta_0 + 3\pi/2$ | $\theta_0$ | $\theta_0 + \pi/2$ |
| $V_{x,3}(t)$ | $\theta_0 + 3\pi/2$ | $\theta_0$ | $\theta_0 + \pi/2$ | $\theta_0 + \pi$ |

When the voltage waveforms are defined according to Table II, the electro-optical layer is required to support a dynamic phase modulation range of $3\pi/2$, as compared to $3\pi$ in the example of Table I, thus enabling a thinner active layer and steeper transitions when phase discontinuities are required.

Alternatively, for a given electro-optical layer thickness, the above approach can be used to reduce the number of phase discontinuities. In this case, the driving scheme is similar to that shown in Table II, but each axis is modulated by values ranging from 0 to $4\pi$ (instead of the $2\pi$ limit of Table II), and the phase summation over the vertical and horizontal electrodes is modulo $4\pi$ (rather than $2\pi$ in Table II). When using the scheme of Table I, a phase discontinuity occurs every time the required modulation crosses $2\pi$, either in the X- or in the Y-axis, even if the electro-optical layer supports a dynamic modulation range of $4\pi$ or more. On the other hand, when a scheme similar to that shown in Table II is used, but with n=2 (modulo $4\pi$), a phase discontinuity occurs every time the required modulation crosses $4\pi$, with cylindrical symmetry.

FIG. 15 is a schematic representation of a phase modulation profile 116 generated by lens 112 when driven as described above, in accordance with an embodiment of the present invention. Profile 116 emulates a Fresnel lens, with an amplitude scale 118 of phase shift ranging from 0 to $4\pi$. Profile 116 includes a central lobe 120 and peripheral orders 122, separated by abrupt phase transitions of amplitude $4\pi$. This scheme significantly decreases the number of phase discontinuities, relative to a Fresnel profile with transitions at every $2\pi$ change of amplitude, and accordingly reduces the areas that these abrupt transitions occupy within the phase modulator, thus improving the accuracy of the phase modulation function.

FIG. 16 is a plot that schematically illustrates a phase modulation curve as a function of the voltage applied across electrodes 110 in lens 112, in accordance with an embodiment of the present invention. As shown in FIG. 16, phase modulations of $\theta_0$, $\theta_0+\pi/2$, $\theta_0+\pi$ and $\theta_0+3\pi/2$ are obtained by applying root mean square (RMS) voltages of 1.02 V, 1.14 V, 1.29 V and 1.46 V, respectively, across the pixels.

FIGS. 17A-17D and 18A-18D are plots that schematically illustrate component voltage waveforms applied to electrodes 110 in a duty cycle modulation scheme of this sort, in accordance with an embodiment of the present invention. FIGS. 17A-17D show four different waveforms, with different duty cycles, that are applied to the X-electrodes, on side 106 of lens 112, while FIGS. 18A-18D show the voltage waveforms, likewise with differing duty cycles, that are applied to the Y-electrodes, on side 108. The voltage waveforms in this example are limited to three values: 0 and ±2.5 V, and provide phase modulations of $\theta_0$, $\theta_0+\pi/2$, $\theta_0+\pi$ and $\theta_0+3$ m/2 as required for the modulation scheme of Table II. Alternatively, other sets of waveforms and modulation schemes can be constructed, with the same or larger numbers of quantization levels. For example, analog driving can be used, in which each electrode can receive one of four or more voltage values in each time slot.

In the example shown in FIGS. 17A-17D and 18A-18D, the voltage applied on the electro-optical layer is of alternating polarity (AC), at a frequency larger than the response time of the electro-optical media (for example, larger than 100 Hz for liquid crystal media). The waveforms shown in FIGS. 17A-17D and 18A-18D are of half a cycle. In practice, these waveforms are duplicated with alternating polarity at a large enough rate so that the response of the electro-optical layer will depend only on the RMS value of the applied voltage.

FIGS. 19A-19G are plots that schematically illustrate voltage waveforms generated across the electro-optical layer in lens 112 as a result of applying different combinations of the waveforms of FIGS. 17A-17D and FIGS. 18A-18D to electrodes 110 on opposing sides 106 and 108 of the lens. For the sake of brevity and simplicity, only a subset of the sixteen combined waveforms is shown. The titles of the plots includes the RMS voltage values of the waveforms, which match the RMS values shown in FIG. 16 and correspond to the phase shift values in Table II.

The voltage differences between the X- and Y-electrodes in this example are limited to the values 0, ±2.5 V, and ±5 V. Using a larger number of voltage values can add more degrees of freedom to the waveforms, which can be used to eliminate the short pulses that appear in some of the waveforms.

Electrically-Tunable Cylindrical Lenses in Series

FIG. 20 is a schematic side view of an optical system 130, in accordance with another embodiment of the invention. As described earlier, system 130 comprises two electrically-tunable cylindrical lenses 132 and 134 arranged in series, with mutually-perpendicular cylinder axes. (For example, the cylinder axis of lens 132 may be vertical in the plane of the figure sheet, while that of lens 134 points into the sheet.) In this manner, lenses 132 and 134 can be controlled together in order to emulate a spherical or aspheric lens with a two-dimensional modulation profile, as the superposition of the respective modulation profiles of lenses 132 and 134.

For ease of manufacturing, it is convenient that lenses 132 and 134 have the same structure, for example as shown in FIGS. 2A and 2B. Assuming electro-optical layer 48 to comprise a polarization-dependent medium, such as a polarization-dependent liquid crystal, the polarization axes of lenses 132 and 134 will then be mutually-perpendicular, as well. Consequently, in the absence of correction, lenses 132 and 134 will operate on different polarizations (and thus will be ineffective as a two-dimensional lens). In order to overcome this limitation, system 130 comprises a polarization rotator 136, such as a quarter-wave plate. Thus, assuming the light entering system 130 to be vertically polarized, in alignment with the polarization axis of lens 132, rotator 136 will rotate the polarization axis by 90° so that the axis is aligned with the polarization axis of lens 134 when the light is incident on lens 134.

Although the above description and the corresponding figures relate separately, for the sake of clarity, to various different features of electrically-tunable lenses, these features should by no means be considered to be mutually exclusive. On the contrary, those skilled in the art will understand, after reading the above description, that these features may be combined in order to achieve still further enhancement of device performance. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical device, comprising:
    an electro-optical layer, having an effective local index of refraction at any given location within an active area of the electro-optical layer that is determined by a voltage waveform applied across the electro-optical layer at the location;
    a first array of first excitation electrodes, which extend along respective, mutually-parallel first axes in a first direction over the active area on a first side of the electro-optical layer;
    a second array of second excitation electrodes, which extend along respective, mutually-parallel second axes in a second direction, orthogonal to the first direction, over the active area on a second side of the electro-optical layer, opposite the first side; and
    control circuitry, which is coupled to apply simultaneously respective first control voltage waveforms to the first excitation electrodes and respective second control voltage waveforms to second excitation electrodes and is configured to concurrently and independently modify both the respective first control voltage waveforms applied to each of the first excitation electrodes and the respective second control voltage waveforms applied to each of the second excitation electrodes so as to generate a specified phase modulation profile in the electro-optical layer.

2. The optical device according to claim 1, wherein the phase modulation profile is defined as a function that is separable into first and second component functions, which respectively vary along the first and second axes, and wherein the first and second control voltage waveforms applied to the first and second excitation electrodes are specified in accordance with the first and second component functions, respectively.

3. The optical device according to claim 2, wherein the first and second component functions are defined in terms of a set of component waveforms that are selected so as to correspond to different, respective phase shifts in the electro-optical layer, such that the phase modulation profile comprises a sum of the respective phase shifts due to the first and second component functions at each location within the active area.

4. The optical device according to claim 3, wherein the component waveforms have different, respective duty cycles.

5. The optical device according to claim 3, wherein the component waveforms are selected so that the sum of the respective phase shifts making up the phase modulation profile is a modular sum with a modulus of $2n\pi$, wherein n is an integer.

6. The optical device according to claim 5, wherein n has different, respective values for at least some different pairs of the first and second component functions.

7. The optical device according to claim 1, wherein the first and second control voltage waveforms are selected so that the phase modulation profile contains abrupt phase transitions, and the device functions as a Fresnel lens.

8. The optical device according to claim 7, wherein the control circuitry is configured to apply the respective first and second control voltage waveforms with opposite polarities to pairs of mutually-adjacent excitation electrodes in a vicinity of the abrupt phase transitions.

9. The optical device according to claim 1, wherein the electro-optical layer comprises a liquid crystal.

10. A method for producing an optical device, the method comprising:
    providing an electro-optical layer, having an effective local index of refraction at any given location within an active area of the electro-optical layer that is determined by a voltage waveform applied across the electro-optical layer at the location;
    positioning a first array of first excitation electrodes to extend along respective, mutually-parallel first axes in a first direction over the active area on a first side of the electro-optical layer;
    positioning a second array of second excitation electrodes to extend along respective, mutually-parallel second axes in a second direction, orthogonal to the first direction, over the active area on a second side of the electro-optical layer, opposite the first side; and
    coupling control circuitry to apply simultaneously respective first control voltage waveforms to the first excitation electrodes and respective second control voltage waveforms to second excitation electrodes and is configured to concurrently and independently modify both the respective first control voltage waveforms applied to each of the first excitation electrodes and the respective second control voltage waveforms applied to each of the second excitation electrodes so as to generate a specified phase modulation profile in the electro-optical layer.

11. The method according to claim 10, wherein the phase modulation profile is defined as a function that is separable into first and second component functions, which respectively vary along the first and second axes, and wherein the first and second control voltage waveforms applied to the first and second excitation electrodes are specified in accordance with the first and second component functions, respectively.

12. The method according to claim 11, wherein the first and second component functions are defined in terms of a set of component waveforms that are selected so as to correspond to different, respective phase shifts in the electro-optical layer, such that the phase modulation profile comprises a sum of the respective phase shifts due to the first and second component functions at each location within the active area.

13. The method according to claim 12, wherein the component waveforms have different, respective duty cycles.

14. The method according to claim 12, wherein the component waveforms are selected so that the sum of the respective phase shifts making up the phase modulation profile is a modular sum with a modulus of $2n\pi$, wherein n is an integer.

15. The method according to claim 14, wherein n has different, respective values for at least some different pairs of the first and second component functions.

16. The method according to claim 10, wherein the first and second control voltage waveforms are selected so that the phase modulation profile contains abrupt phase transitions, and the optical device functions as a Fresnel lens.

17. The method according to claim 16, wherein the control circuitry is configured to apply the respective first and second control voltage waveforms with opposite polarities to pairs of mutually-adjacent excitation electrodes in a vicinity of the abrupt phase transitions.

18. The method according to claim 10, wherein the electro-optical layer comprises a liquid crystal.

19. An optical device, comprising:
an electro-optical layer, having an effective local index of refraction at any given location within an active area of the electro-optical layer that is determined by a voltage waveform applied across the electro-optical layer at the location, the electro-optical layer having opposing first and second sides;
conductive electrodes extending over the first and second sides of the electro-optical layer, the conductive electrodes comprising an array of excitation electrodes comprising parallel stripes of a transparent conductive material; and
control circuitry, which is coupled to apply respective control voltage waveforms to the excitation electrodes and to modify the control voltage waveforms applied to each of the excitation electrodes concurrently and independently so as to generate in the electro-optical layer a specified phase modulation profile containing abrupt phase transitions, while applying the respective control voltage waveforms with opposite polarities to pairs of mutually-adjacent excitation electrodes in a vicinity of the abrupt phase transitions.

20. The optical device according to claim 19, wherein the control voltage waveforms are selected so as to cause the device to function as a Fresnel lens.

* * * * *